US008786132B2

(12) United States Patent
Morita et al.

(10) Patent No.: US 8,786,132 B2
(45) Date of Patent: Jul. 22, 2014

(54) POWER SUPPLY DEVICE

(75) Inventors: Kazuki Morita, Osaka (JP); Yoshio Mizutani, Osaka (JP); Norio Nakajima, Kyoto (JP)

(73) Assignee: Panasonic Corporation, Osaka (JP)

( * ) Notice: Subject to any disclaimer, the term of this patent is extended or adjusted under 35 U.S.C. 154(b) by 1115 days.

(21) Appl. No.: 12/740,796

(22) PCT Filed: Oct. 28, 2008

(86) PCT No.: PCT/JP2008/003057
§ 371 (c)(1),
(2), (4) Date: Apr. 30, 2010

(87) PCT Pub. No.: WO2009/057277
PCT Pub. Date: May 7, 2009

(65) Prior Publication Data
US 2010/0308659 A1    Dec. 9, 2010

(30) Foreign Application Priority Data

Nov. 1, 2007   (JP) .................................. 2007-284982

(51) Int. Cl.
*H02J 9/00*   (2006.01)
*H02J 7/00*   (2006.01)

(52) U.S. Cl.
USPC ........................................................... 307/66

(58) Field of Classification Search
USPC .............. 307/64–66, 113, 115, 125, 130, 9.1, 307/10.1
See application file for complete search history.

(56) References Cited

U.S. PATENT DOCUMENTS 5,146,395 A * 9/1992 McKie ............................ 363/13
7,259,481 B2 * 8/2007 Eaton et al. .................... 307/125

(Continued)

FOREIGN PATENT DOCUMENTS

| EP | 1811629 A1 | 5/2007 |
| EP | 1908622 A1 | 5/2007 |
| JP | 11-313490 A | 11/1999 |
| JP | 2002-325377 A | 11/2002 |

(Continued)

OTHER PUBLICATIONS

International Search Report for PCT/JP2008/003057, Jan. 27, 2009.

*Primary Examiner* — Rexford Barnie
*Assistant Examiner* — Daniel Kessie
(74) *Attorney, Agent, or Firm* — RatnerPrestia

(57) ABSTRACT

A power supply device is used for an apparatus which includes a power generator and a parallel assembly including a main power supply and a load. The power supply device includes a input port connected to an output terminal of the power generator, an output port connected to the parallel assembly, an electric storage element charged with electric power generated by the power generator, a switching unit, a current switcher for restricting a current flowing from the main power supply to the electric storage element, a controller for controlling the power generator such that the voltage of the output port becomes a predetermined voltage. The switching unit is connected to the first input port, the output port, and the electric storage element. The switching unit connects the electric storage element, the power generator, and the parallel assembly in parallel to each other when the electric storage element is charged with the electric power generated by the power generator. The switching unit connects the electric storage element, the power generator, and the parallel assembly in series to each other when the electric storage element is discharged to supply electric power stored in the electric storage element to the parallel assembly. This power supply device can provide an apparatus including only one power generator with a regenerating function.

16 Claims, 23 Drawing Sheets

(56) References Cited

U.S. PATENT DOCUMENTS

| | | | |
|---|---|---|---|
| 7,763,993 B2 * | 7/2010 | Groff et al. | 307/71 |
| 2002/0158513 A1 | 10/2002 | Amano et al. | |
| 2004/0113593 A1 * | 6/2004 | Aoyama | 322/28 |
| 2006/0097577 A1 * | 5/2006 | Kato et al. | 307/10.1 |
| 2011/0121661 A1 * | 5/2011 | Kawakami et al. | 307/110 |
| 2011/0140527 A1 * | 6/2011 | Choi | 307/76 |

FOREIGN PATENT DOCUMENTS

| | | | | |
|---|---|---|---|---|
| JP | 2004-080943 A | 3/2004 | | |
| JP | 2004-80943 A | 3/2004 | | |
| JP | 2004080943 A | * 3/2004 | | H02J 7/00 |
| JP | 2007-135284 A | 5/2007 | | |
| JP | 2007-159280 A | 6/2007 | | |
| JP | 2008-043103 A | 2/2008 | | |

* cited by examiner

POWER SUPPLY DEVICE

THIS APPLICATION IS A U.S. NATIONAL PHASE APPLICATION OF PCT INTERNATIONAL APPLICATION No. PCT/JP2008/003057.

TECHNICAL FIELD

The present invention relates to a power supply device having a regenerating function.

BACKGROUND ART

Vehicles having a regenerating function to recover and reuse kinetic energy generated during braking as electric energy with a power generator have been recently developed. This regenerating function allows effective use of the kinetic energy that has not been used, and hence allows energy saving of the vehicle.

FIG. 17 is a schematic circuit diagram of power supply device 501 described in Patent Document 1. Power supply device 501 is connected to an alternating-current (AC) power source. AC power supply 101 for driving an induction motor with the AC power source is connected to converter 111. Converter 111 converts an AC power output from AC power supply 101 into direct-current (DC) power, and outputs the DC power from positive output terminal 111A and negative output terminal 111B. Converter 111 has AC reactor 103, bridge rectifier 105, smoothing reactor 107, and smoothing capacitor 109. Switch 113 has branch contacts 115 and 117 and common contact 118. Common contact 118 is connected selectively to branch contacts 115 and 117. Positive output terminal 111A of converter 111 is connected to branch contact 115 of switch 113. Branch contact 117 of switch 113 is connected to negative output terminal 111B of converter 111. The anode of diode 119 and one end of capacitor 121 are connected to common contact 118 of switch 113. Capacitor 121 is an electric double layer capacitor having a large capacity. The cathode of diode 119 and another end of capacitor 121 are connected to positive terminal 123A of inverter 123. Negative output terminal 111B of converter 111 is connected to negative terminal 123B of the inverter. Diode 119 and capacitor 121 are connected in parallel to each other. Inverter 123 includes a bridge circuit having plural transistors and plural flywheel diodes. Induction motor 125 is connected to terminals 123C of inverter 123.

An operation of power supply device 501 will be described below. First, when induction motor 125 starts or accelerates, switch 113 connects branch contact 115 to common contact 118. Thus, the AC power from AC power supply 101 is converted into DC power by converter 111, and the DC power is input to inverter 123 via switch 113 and diode 119. At this moment, capacitor 121 stores no power. The DC power input to inverter 123 is converted into AC power and is supplied to induction motor 125. Induction motor 125 is thus driven by AC power supply 101.

When induction motor 125 decelerates, switch 113 is switched to connect branch contact 117 to common contact 118. At this moment, induction motor 125 operates as a power generator to generate AC power. The generated AC power is converted into DC power by inverter 123. Capacitor 121 stored the DC power.

Then, when induction motor 125 accelerates again, switch 113 is switched to connect branch contact 115 to common contact 118. Thus, converter 111 is connected to capacitor 121 in series. Both the power stored in capacitor 121 and the power output from AC power supply 101 via converter 111 are supplied to induction motor 125 via inverter 123. Thus, power supply device 501 has a regenerating function, and reduces the power supplied from AC power supply 101 to induction motor 125.

Power supply device 501 can be used for an electric train including induction motor 125 driven by AC power supply 101, but cannot be used for ordinary automobile for the following reason. If power supply device 501 is applied to the ordinary automobile, a power generator (alternator) corresponds to AC power supply 101. Induction motor 125 operates as the power generator during deceleration, so that induction motor 125 corresponds to another power generator. Therefore, power supply device 501 is applicable to an electric train including two power generators. However, the ordinary automobile includes only one power generator, so that power supply device 501 is not applicable to the automobile and does not provide the automobile with the regenerating function.

Patent Document 1: JP3678582B

SUMMARY OF THE INVENTION

A power supply device is used for an apparatus which includes a power generator and a parallel assembly including a main power supply and a load. The power supply device includes a input port connected to an output terminal of the power generator, an output port connected to the parallel assembly, an electric storage element charged with electric power generated by the power generator, a switching unit, a current switcher for restricting a current flowing from the main power supply to the electric storage element, a controller for controlling the power generator such that the voltage of the output port becomes a predetermined voltage. The switching unit is connected to the first input port, the output port, and the electric storage element. The switching unit connects the electric storage element, the power generator, and the parallel assembly in parallel to each other when the electric storage element is charged with the electric power generated by the power generator. The switching unit connects the electric storage element, the power generator, and the parallel assembly in series to each other when the electric storage element is discharged to supply electric power stored in the electric storage element to the parallel assembly.

This power supply device can provide an apparatus including only one power generator with a regenerating function.

REFERENCE MARKS IN THE DRAWINGS

11 Power Supply Device
13 Power Generator
13A Output Terminal (First Output Terminal)
13B Output Terminal (Second Output Terminal)
15 Main Power Supply
17 Load
19 Parallel Assembly
21 Input Port (First Input Port)
21A Input Port (First Input Port)
21B Input Port (Second Input Port)
23 Output Port
25 Switching Unit
27 Electric Storage Element
27C Capacitor
31 Controller
33 Diode (First Diode)
35 Diode (Second Diode)
37 Current Switcher
39 Selector Switch
39A Branch Port (First Branch Port)
39B Branch Port (Second Branch Port)
39C Common Port
47 Node
51 Node
53 Diode (Third Diode)
61 Diode (First Diode)
63 Charging Switch
65 Diode (Second Diode)
127 Discharging Circuit
211 Power Supply Device
225 Switching Unit
237 Current Switcher
311 Power Supply Device
325 Switching Unit
337 Current Switcher
391 Voltage Detector
611 Power Supply Device
633 Switch (First Switch)
635 Switch (Second Switch)
711 Power Supply Device
733 Switch (First Switch)
735 Switch (Second Switch)
753 Switch (Third Switch)
811 Power Supply Device
861 Switch (First Switch)
865 Switch (Second Switch)
1001 Apparatus
2001 Apparatus
3001 Apparatus
6001 Apparatus
7001 Apparatus
8001 Apparatus
9001A Apparatus
9001B Apparatus
9001C Apparatus

DETAILED DESCRIPTION OF PREFERRED EMBODIMENTS

Exemplary Embodiment 1

Figure 1:
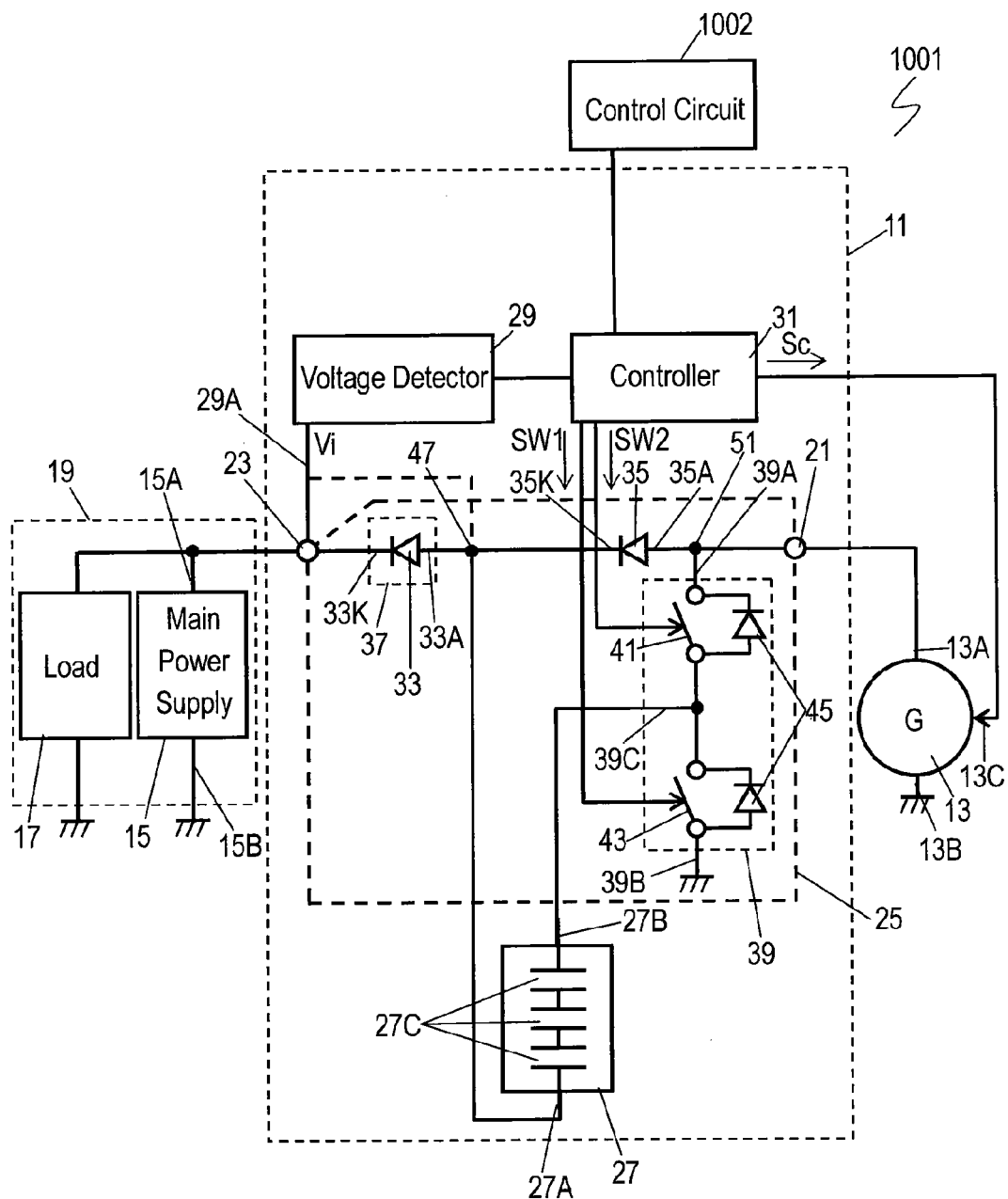
FIG. 1 is a block circuit diagram of an apparatus including a power supply device in accordance with Exemplary Embodiment 1 of the present invention.

FIG. 1 is a block circuit diagram of apparatus 1001 including power supply device 11 in accordance with Exemplary Embodiment 1 of the present invention. Apparatus 1001 includes power supply device 11, power generator 13, main power supply 15, load 17, and control circuit 1002. Main power supply 15 and load 17 are connected in parallel to each other to form parallel assembly 19. Power supply device 11 is connected between power generator 13 and parallel assembly 19. According to Embodiment 1, apparatus 1001 is an automobile including a power source, such as an engine, for driving power generator 13. Power generator 13 is driven by the power source, and generates direct-current (DC) power from output terminals 13A and 13B. The voltage of output terminal 13A is higher than that of output terminal 13B. Control circuit 1002 outputs control signal Sc to control terminal 13C of power generator 13, and controls the DC voltage between output terminals 13A and 13B generated in power generator 13. According to Embodiment 1, power generator 13 is an alternator, main power supply 15 is a rechargeable battery for automobile, and load 17 is various electric devices, such as an audio apparatus, mounted to the automobile. Main power supply 15 has ends 15A and 15B. End 15B is connected to a ground. The potential of end 15A is higher than that of end 15B.

Power supply device 11 includes switching unit 25, electric storage element 27, voltage detector 29, and controller 31. Switching unit 25 has input port 21 connected to power generator 13, and has output port 23 connected to parallel assembly 19. Electric storage element 27 is charged with electric power generated by power generator 13, and stores the electric power. Specifically, in order to store the electric power rapidly increased by power generator 13 during regenerative braking, electric storage element 27 includes plural electric double layer capacitors 27C connected in series to each other and having a rapid charge/discharge property, and has a capacity sufficiently storing large electric power. The number of electric double layer capacitors 27C forming electric storage element 27 is determined according to, e.g. electric power required by apparatus 1001. Electric double layer capacitors 27C may be connected in series or in parallel. Voltage detector 29 detects voltage Vi of detecting port 29A. Power generator 13, switching unit 25, and voltage detector 29 are connected to controller 31. Controller 31 is implemented by a microcomputer and its peripheral circuit, and controls an entire operation of power supply device 11. Controller 31 supplies control signal Sc for controlling the voltage output from power generator 13 to power generator 13, and supplies control signals SW1 and SW2 to switching unit 25 for controlling switching unit 25. Controller 31 is connected to control circuit 1002 of apparatus 1001.

Switching unit 25 will be described in detail below.

Diodes 33 and 35 are connected in series between input port 21 and output port 23 of switching unit 25. Anode 35A of diode 35 is connected to input port 21. Anode 33A of diode 33 is connected to cathode 35K of diode 35 at node 47. Cathode 33K of diode 33 is connected to output port 23. Diode 33 functions as current switcher 37 that cut off a current flowing from main power supply 15 to electric storage element 27 while not cut off a current flowing from electric storage element 27 to main power supply 15.

Selector switch 39 is connected between input port 21 and the ground. Selector switch 39 includes switches 41 and 43 that are connected in series at common port 39C between input port 21 and the ground. Switch 41 is connected between common port 39C and branch port 39A. Switch 43 is connected between common port 39C and branch port 39B. Branch port 39A and branch port 39B are connected to input port 21 and the ground, respectively. Switches 41 and 43 are controlled by control signals SW1 and SW2 supplied from controller 31, respectively. Selector switch 39 connects common port 39C to branch ports 39A and 39B selectively, i.e., exclusively, based on control signals SW1 and SW2 supplied from controller 31. Selector switch 39 can disconnect both branch ports 39A and 39B from common port 39C based on control signals SW1 and SW2. According to Embodiment 1, each of switches 41 and 43 is implemented by a field effect transistor (FET). Each FET has parasitic diode 45 that is connected to each of switches 41 and 43 in parallel. Parasitic diodes 45 are always nonconductive, namely each FET is connected so that the voltage of the cathode of parasitic diode 45 is higher than that of the anode of parasitic diode 45. Branch port 39A of selector switch 39 is connected to anode 35A of diode 35 at node 51. Node 51 is connected to input port 21.

Electric storage element 27 has end 27B connected to common port 39C of selector switch 39 and has end 27A connected to node 47. Detecting port 29A of voltage detector 29 is connected to output port 23, and voltage detector 29 detects the voltage of output port 23, namely, an output voltage of power supply device 11. Controller 31 controls the voltage between output terminals 13A and 13B of power generator 13 to cause the voltage of output port 23 to be a predetermined voltage. In the case that main power supply 15 is a battery for automobile having a rated voltage of 12V, the predetermined voltage is determined to be a voltage higher than the rated voltage, such as 14V or 14.5V. Detecting port 29A of voltage detector 29 may be connected to node 47 instead of output port 23. Only diode 33 is connected between output port 23 and node 47. A voltage drop by diode 33 is substantially constant. Controller 31 controls power generator 13 to make the voltage of node 47 constant, hence making the voltage of output port 23 substantially constant.

An operation of apparatus 1001 including power supply device 11 will be described below.

Figure 2:
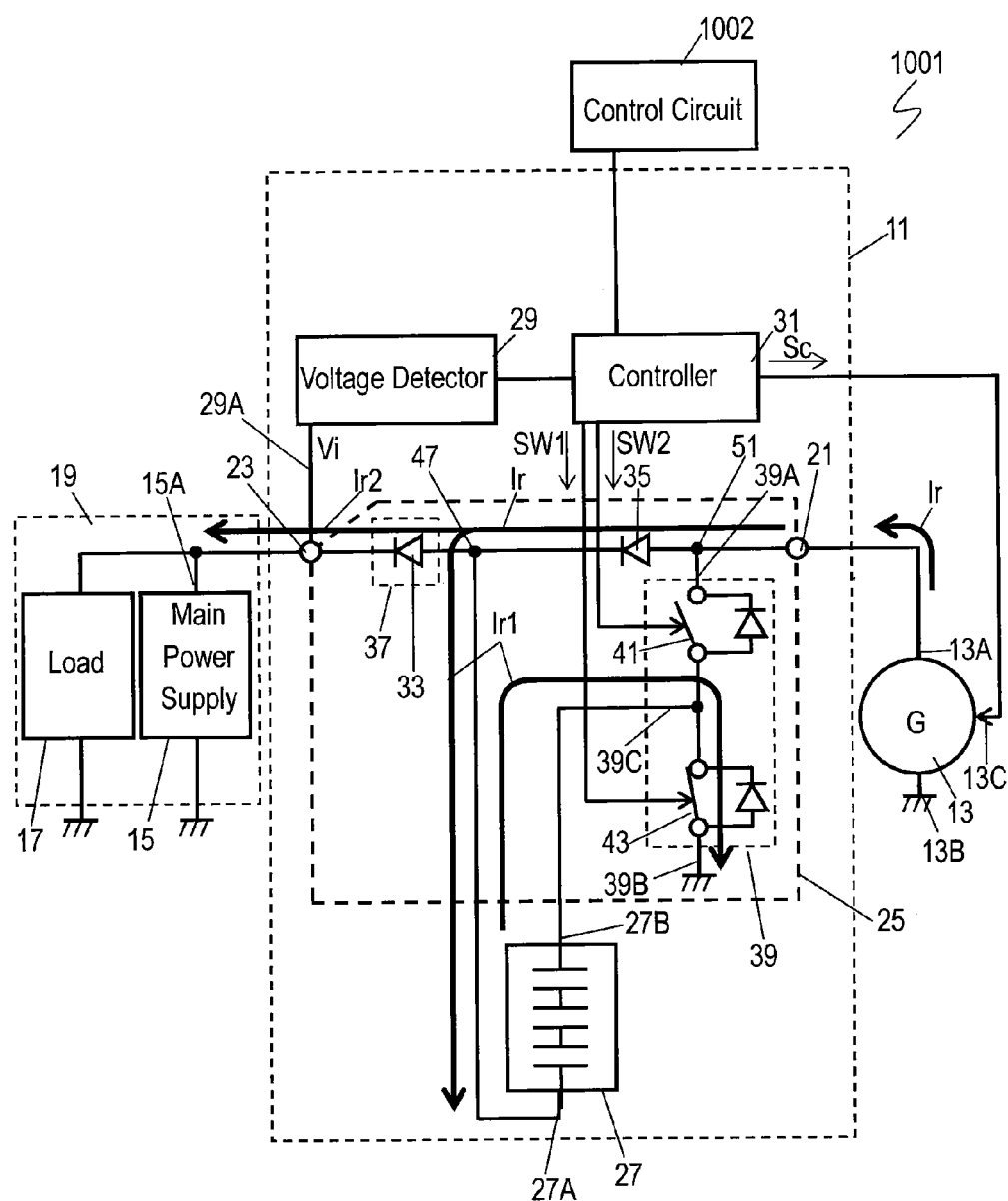
FIG. 2 is a block circuit diagram of the power supply device in accordance with Embodiment 1 while an electric storage element of the power supply device is charged

First, an operation for storing, in electric storage element 27, electric power generated by power generator 13 due to regenerative braking of an automobile as apparatus 1001 will be described below with reference to FIG. 2. In this operation, control circuit 1002 regenerates braking energy as much as possible by actively transmitting the power of the engine to power generator 13 during deceleration of the automobile. FIG. 2 is a block circuit diagram of power supply device 11 while electric storage element 27 is charged. When a driver operates the brake of the automobile, control circuit 1002 transmits a deceleration signal indicating the deceleration of the automobile to controller 31. Upon receiving the deceleration signal, controller 31 transmits control signals SW1 and SW2 to turn off switch 41 and to turn on switch 43. In other words, common port 39C of selector switch 39 is connected to branch port 39B and is disconnected from branch port 39A. Common port 39C is connected to the ground to which branch port 39B is connected. Thus, electric storage element 27 and power generator 13 are connected in parallel via diode 35. Thus, controller 31 controls switching unit 25 to allow selector switch 39 to connect electric storage element 27 and power generator 13 in parallel to each other.

While common port 39C of selector switch 39 is connected to the ground, a large current flows from main power supply 15 to electric storage element 27 when the voltage of end 15A of main power supply 15 is higher than the voltage of end 27A of electric storage element 27. This operation causes the voltage of main power supply 15 to drop, hence disabling main power supply 15 to drive load 17. Further, electric storage element 27 is charged with the large current from main power supply 15, but is not charged with a regenerative current generated by regenerative braking in power generator 13, thus being not prevented from storing the electric power generated by power generator 13 due to the regenerative braking. Current switcher 37 cut off the current supplied from main power supply 15 to electric storage element 27. Cathode 33K of diode 33 of current switcher 37 is connected to output port 23, i.e., main power supply 15. Anode 33A of diode 33 is connected to node 47. The current flowing from main power supply 15 to electric storage element 27 can be restricted to substantially zero. Current switcher 37 is implemented not only by diode 33, but also by a semiconductor switch or a DC/DC converter that can restrict the current flowing from main power supply 15 to electric storage element 27.

As shown in FIG. 2, regenerative current Ir generated by power generator 13 due to regenerative braking flows from power generator 13 to node 47 via input port 21 and diode 35.

The maximum value of regenerative current Ir is determined by the capacity of power generator 13. When common port 39C of selector switch 39 is connected to the ground, current Ir1 which is a part of regenerative current Ir flows to electric storage element 27 to charge electric storage element 27 to be stored. When electric storage element 27 is not charged sufficiently, the voltage of electric storage element 27 is lower than the voltage of main power supply 15, and turn off diode 33. Therefore, substantially all regenerative current Ir flows to electric storage element 27 (Ir=Ir1) to charge it, and does not flow to parallel assembly, i.e., main power supply 15 or load 17. At this moment, a stable voltage is supplied to load 17 from main power supply 15. When electric storage element 27 is charged sufficiently and the voltage of end 27A of electric storage element 27 becomes higher than the voltage of end 15A of main power supply 15 by a forward voltage of diode 33, current Ir1 as a part of regenerative current Ir flows to electric storage element 27 to charge it, and current Ir2 (=Ir−Ir1) as the remaining part of regenerative current Ir flows from node 47 to main power supply 15 and load 17 of parallel assembly 19 via diode 33 and output port 23.

Figure 3:
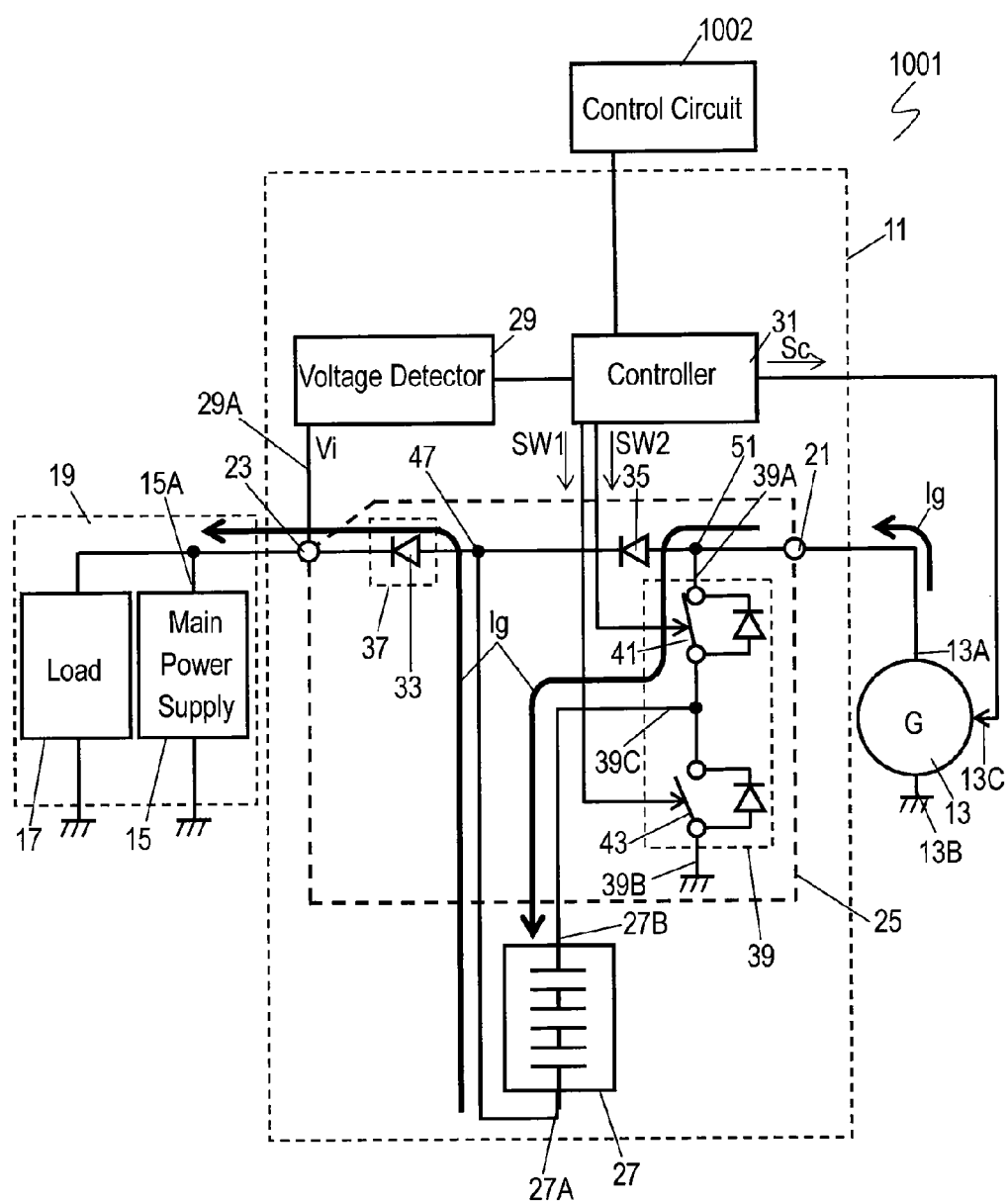
FIG. 3 is a block circuit diagram of the power supply device in accordance with Embodiment 1 while the electric storage element of the power supply device is discharged.

Next, an operation of power supply device 11 for supplying the electric power stored in electric storage element 27 to parallel assembly 19 when the regenerative braking of the automobile as apparatus 1001 terminated will be described below. FIG. 3 is a block circuit diagram of power supply device 11 having electric storage element 27 is discharged. When the driver releases the brake and operates an accelerator to accelerate the automobile, control circuit 1002 transmits an acceleration signal indicating the acceleration of the automobile to controller 31. Upon receiving the acceleration signal, controller 31 transmits control signals SW1 and SW2 to turn on switch 41 and turn off switch 43. In other words, common port 39C of selector switch 39 is connected to branch port 39A and is disconnected from branch port 39B, and common port 39C is connected to input port 21 to which branch port 39A is connected. This operation connects electric storage element 27 and power generator 13 in series to each other. Thus, controller 31 controls switching unit 25 to cause selector switch 39 to connect electric storage element 27 and power generator 13 in series to each other.

When electric storage element 27 is charged and stores electric power, the voltage of end 27A of electric storage element 27 is higher than the voltage of end 27B, hence turning off diode 35. Therefore, as shown in FIG. 3, power generation current Ig, a current generated by power generator 13 driven by the engine during acceleration, flows to electric storage element 27 via input port 21 and switch 41. Since electric storage element 27 is charged with regenerative current Ir (Ir1) shown in FIG. 2 and is connected to power generator 13 in series, power generation current Ig flows also to electric storage element 27, and electric storage element 27 is discharged. Power generation current Ig is supplied to main power supply 15 and load 17 of parallel assembly 19 via diode 33 and output port 23. Controller 31 transmits control signal Sc to power generator 13 to control power generator 13 such that the voltage of output port 23 detected by voltage detector 29 is a voltage, e.g. 14V, slightly higher than the rated voltage of main power supply 15. Thus, controller 31 protects load 17 from being applied a voltage exceeding an allowable voltage of load 17 to.

Controller 31 controls power generator 13 such that the voltage of output port 23 is a predetermined voltage. Hence, when the voltage between ends 27A and 27B of electric storage element 27 is not zero upon electric storage element 27 being charged, controller 31 decreases the voltage of power generator 13 accordingly. This operation reduces energy required for driving power generator 13, and reduces a load on the engine, accordingly reducing energy consumed by the entire automobile as apparatus 1001. Executing this operation particularly during the acceleration that applies a large load on the engine, the power supply device improves efficiency of the engine and reduces energy consumption significantly. At this moment, the voltage of input port 21, i.e., the voltage of power generator 13, is lower than the voltage of node 47, hence turning off diode 35. Therefore, power generation current Ig from power generator 13 is not supplied to parallel assembly 19 via diode 35.

Thus, when electric storage element 27 is charged with the current generated by power generator 13, switching unit 25 is operable to connect electric storage element 27, power generator 13, and parallel assembly 19 in parallel to each other. When electric storage element 27 is discharged to supply the electric power stored in electric storage element 27 to parallel assembly 19, switching unit 25 is operable to connect electric storage element 27, power generator 13, and parallel assembly 19 in series to each other.

Figure 4A:
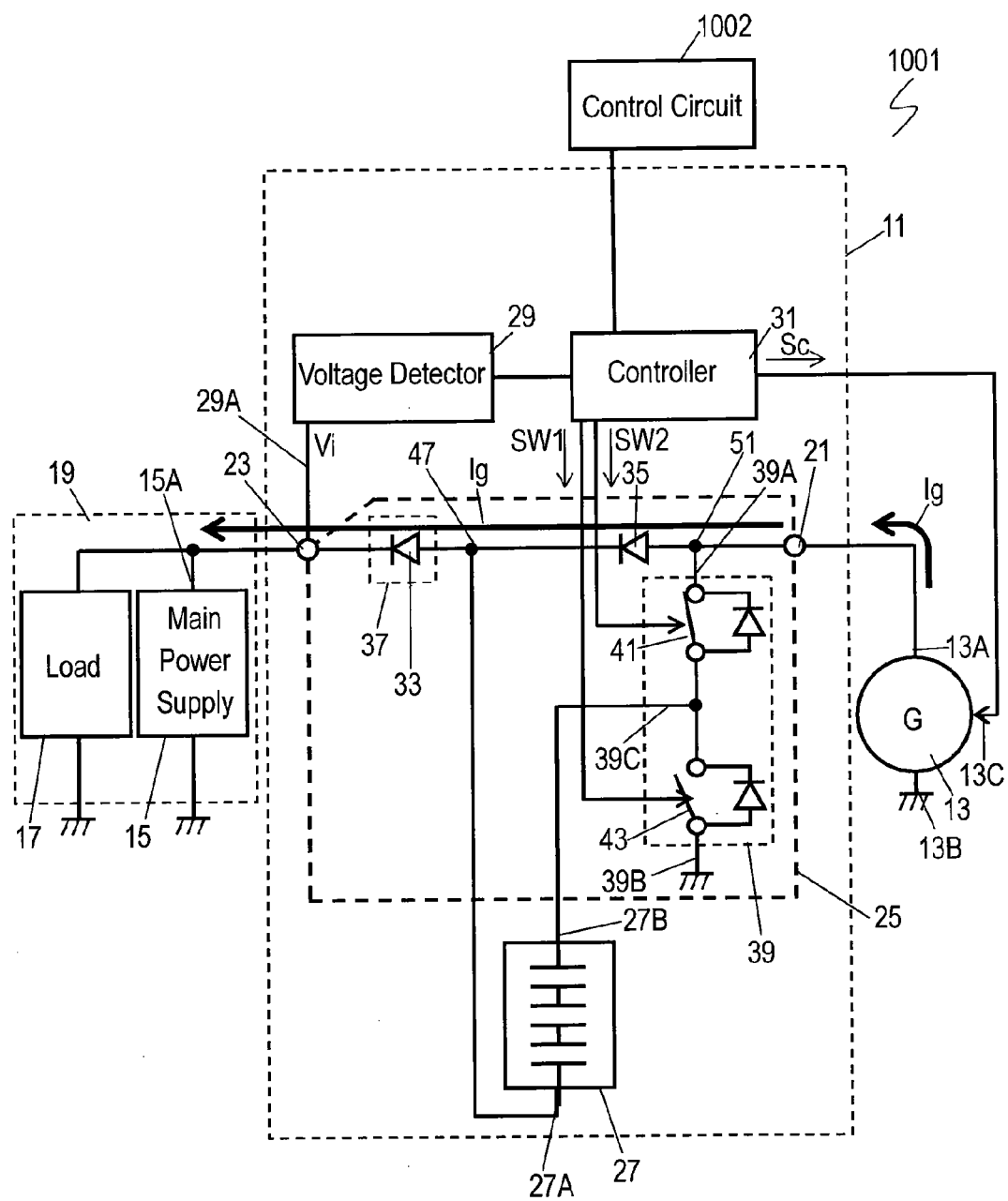
FIG. 4A is a block circuit diagram of the power supply device in accordance with Embodiment 1 while the electric storage element of the power supply device is neither charged nor discharged

FIG. 4A is a block circuit diagram of power supply device 11 when electric storage element 27 is neither being charged nor discharged. Since the voltage of electric storage element 27 decreases with discharge, controller 31 increases the voltage of power generator 13 such that the voltage of output port 23 becomes the predetermined voltage. Even when electric storage element 27 discharges to store no electric power, controller 31 controls power generator 13 such that the voltage of output port 23 becomes the predetermined voltage. Therefore, the voltage of input port 21 becomes higher than the voltage of node 47, hence turning on diode 35, as shown in FIG. 4A. At this moment, as shown in FIG. 4A, power generation current Ig from power generator 13 is supplied to main power supply 15 and load 17 of parallel assembly 19 via input port 21, diode 35, node 47, diode 33, and output port 23 without passing through electric storage element 27, thus neither charging nor discharging electric storage element 27. Power generation current Ig flows to parallel assembly 19 via power supply device 11 although the voltage of output port 23 becomes lower than the voltage of input port 21 by the forward voltage of diodes 33 and 35. At this moment, similarly to an ordinary automobile including no power supply device 11, power generator 13 supplies the electric power to load 17 in apparatus 1001 while charging main power supply 15.

Thus, while controller 31 controls the output voltage of power generator 13 such that the voltage detected by voltage detector 29 becomes the predetermined voltage, controller 31 controls switching unit 25 to connect electric storage element 27 to power generator 13 in parallel, thereby storing the electric power from power generator 13 in electric storage element 27. Controller 31 controls switching unit 25 such that electric storage element 27 is connected to power generator 13 in series, thereby supplying the electric power stored in electric storage element 27 to main power supply 15 and load 17. Thus, power supply device 11 adds the regenerating function to apparatus 1001 with only single power generator 13 regardless of charge and discharge of electric storage element 27.

Figure 4B:
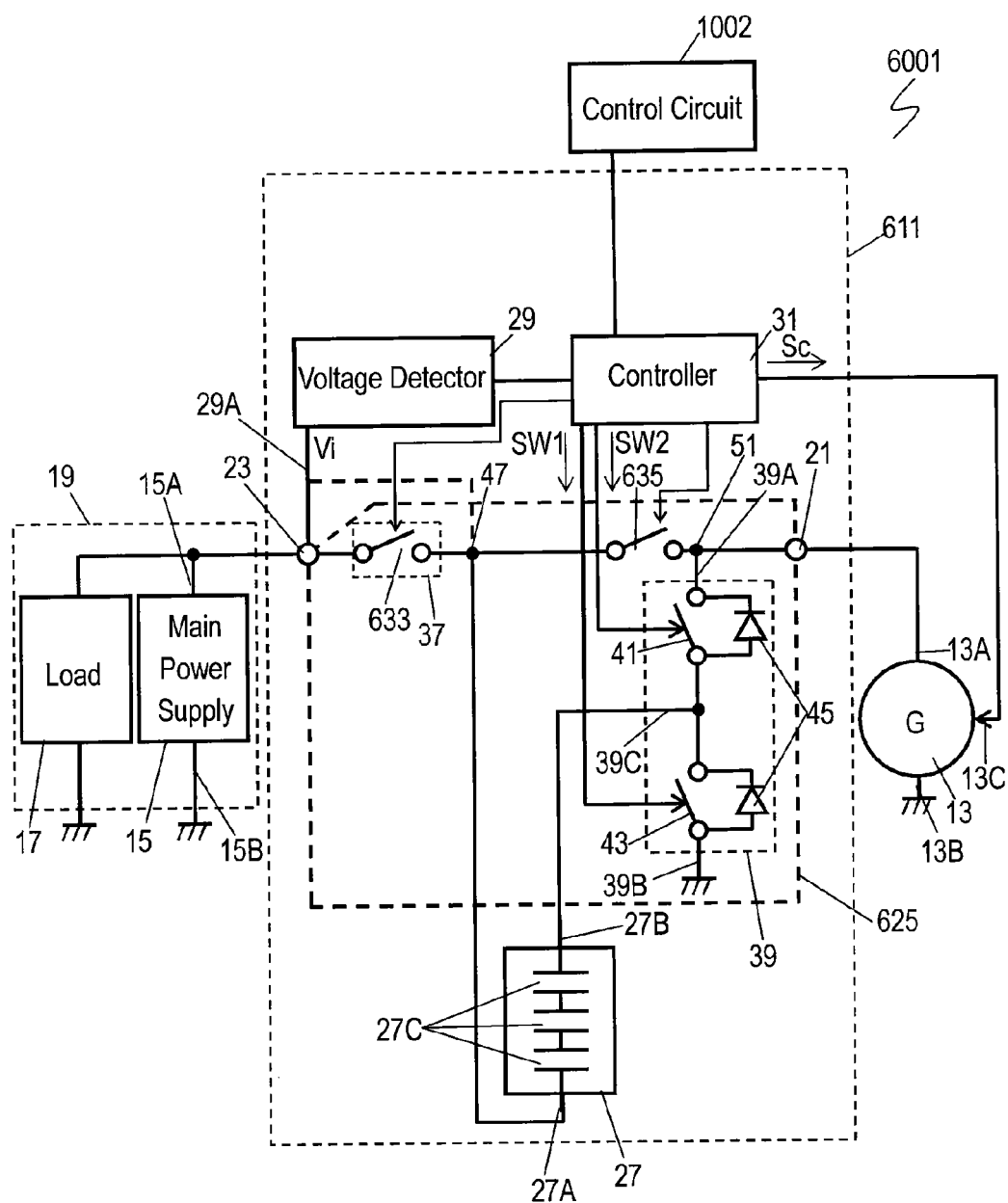
FIG. 4B is a block circuit diagram of an apparatus including another power supply device in accordance with Embodiment 1.

FIG. 4B is a block circuit diagram of apparatus 6001 including another power supply device 611 according to Embodiment 1. In FIG. 4B, components identical to those of apparatus 1001 shown in FIG. 1 are denoted by the same reference numerals, and their description will be omitted. In power supply device 11 shown in FIG. 1, diodes 33 and 35 are turned on and off according to the voltages of input port 21, output port 23, and node 47. Power supply device 611 shown in FIG. 4B includes switches 633 and 635 turned on and off by controller 31, instead of diodes 33 and 35 of power supply device 11 shown in FIG. 1. In other words, switch 633 is controlled by controller 31 such that switch 633 is turned on when the voltage of output port 23 is lower than the voltage of node 47, and switch 633 is turned off when the voltage of output port 23 is higher than the voltage of node 47. Switch 635 is controlled by controller 31 such that switch 635 is turned on when the voltage of node 47 is lower than that of input port 21, and switch 635 is turned off when the voltage of node 47 is higher than that of input port 21. Each of diodes 33 and 35 has a forward voltage drop. Switches 633 and 635 significantly reduce the voltage drops, and allow the voltage generated by power generator 13 to decrease accordingly. This operation reduces a load on power generator 13, and saves energy consumed by apparatus 6001. In power supply device 611 shown in FIG. 4B, both diodes 33 and 35 of power supply device 11 shown in FIG. 1 are replaced by switches 633 and 635, respectively. However, only one of diodes 33 and 35 may be replaced by a switch. Each of switches 633 and 635 can be implemented by a semiconductor switch, such as an FET, similarly to switches 41 and 43, or a mechanical switch, such as a relay. The FET is connected so that the polarity of a parasitic diode of the FET is directed identically to each of diodes 33 and 35.

Figure 17:
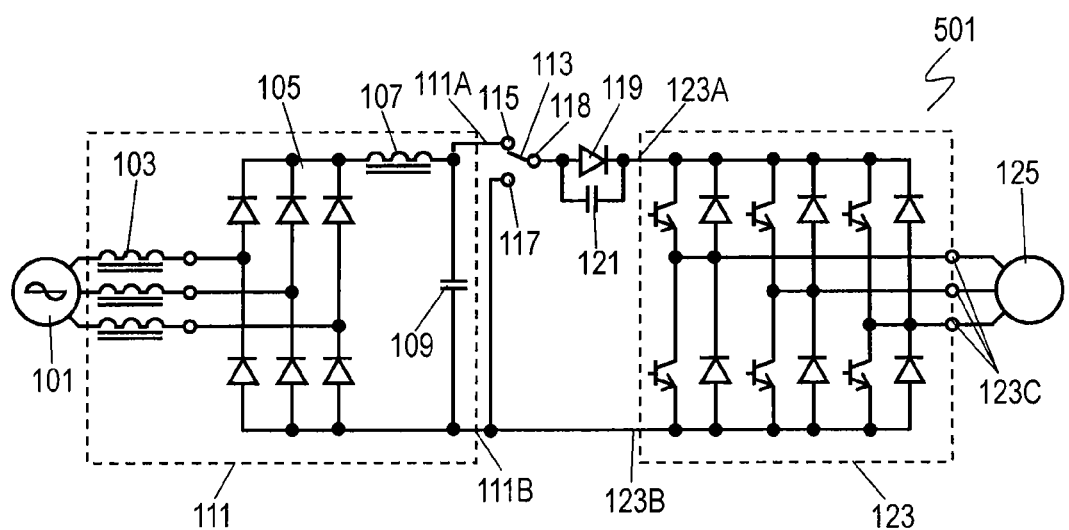
FIG. 17 is a schematic circuit diagram of a conventional power supply device.

In conventional power supply device 501 shown in FIG. 17, induction motor 125 functions as both power generator 13 and load 17 shown in FIG. 1. Induction motor 125 cannot function as a power generator while functioning as the load, and cannot function as the load while functioning as the power generator. In the case that power supply device 501 is applied to an automobile, a load is connected between the cathode of diode 119 and a negative electrode (ground) of inverter 123 shown in FIG. 17. In order to charge capacitor 121 corresponding to the electric storage element with the regenerative power generated by induction motor 125, common contact 118 of switch 113 is connected to branch contact 117. At this moment, capacitor 121 is not charged sufficiently, accordingly causing the voltage of capacitor 121 to be low. When common contact 118 is connected to branch contact 117, a voltage applied to the load rapidly decreases and increases as the charging of capacitor 121, thus preventing the load from operating stably.

On the other hand, in power supply device 11 according to Embodiment 1 shown in FIG. 2, controller 31 controls switching unit 25 such that power generator 13 and electric storage element 27 are connected in parallel when power generator 13 generates regenerative current Ir, thereby charging electric storage element 27 with regenerative current Ir to store regenerative power in electric storage element 27. When electric storage element 27 is not charged sufficiently, current switcher 37 including diode 33 prevents any current from flowing from main power supply 15 to electric storage element 27. This operation allows main power supply 15 to supply a stable voltage to load 17. Power supply device 11 is useful for apparatus 1001, such as an automobile, including single power generator 13.

Exemplary Embodiment 2

Figure 5:
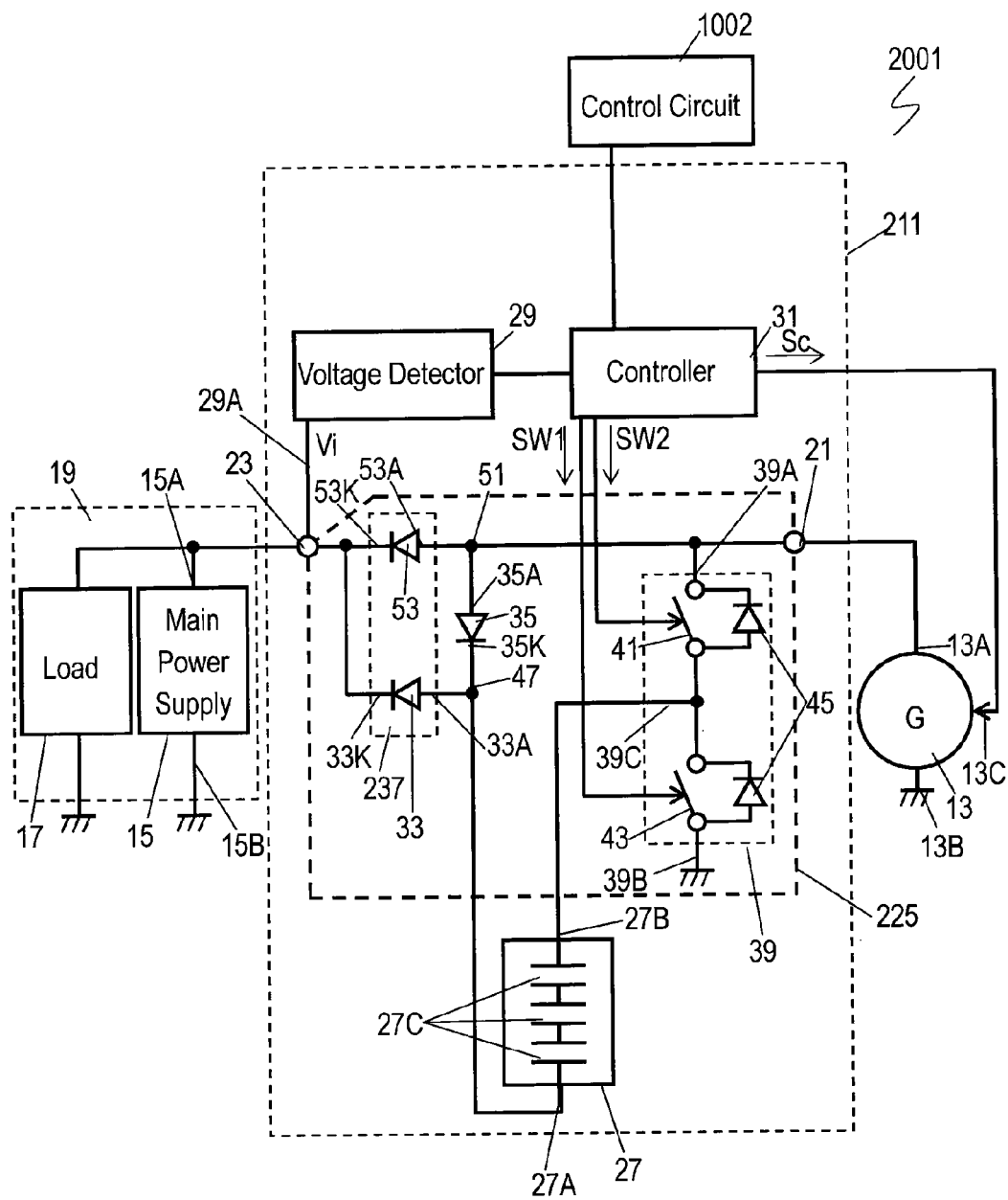
FIG. 5 is a block circuit diagram of a power supply device in accordance with Exemplary Embodiment 2 of the invention.

FIG. 5 is a block circuit diagram of apparatus 2001 including power supply device 211 in accordance with Exemplary Embodiment 2 of the present invention. In FIG. 5, components identical to those of apparatus 1001 of Embodiment 1 shown in FIG. 1 are denoted by the same reference numerals, and their description will be omitted. Power supply device 211 further includes diode 53 connected between node 51 and output port 23 of power supply device 11 according to Embodiment 1 shown in FIG. 1. Anode 53A and cathode 53B of diode 53 are connected to node 51 and output port 23, respectively. Diodes 33 and 53 constitute current switcher 237.

Detecting port 29A of voltage detector 29 is connected to output port 23, and thus, voltage detector 29 detects the voltage of output port 23. Controller 31 controls the voltage output from power generator 13 based on the voltage detected by voltage detector 29. Detecting port 29A of voltage detector 29 is connected to a position at which all current flowing to parallel assembly 19 flows to regardless of charge and discharge of electric storage element 27 and which has a voltage proportional to the voltage of output port 23. The position satisfying the above condition is only output port 23 since the current flows to parallel assembly 19 via two paths, diodes 33 and 53, in power supply device 211 according to Embodiment 2. Therefore, detecting port 29A of voltage detector 29 is connected to output port 23.

An operation of apparatus 2001 including power supply device 211 will be described below.

Figure 6:
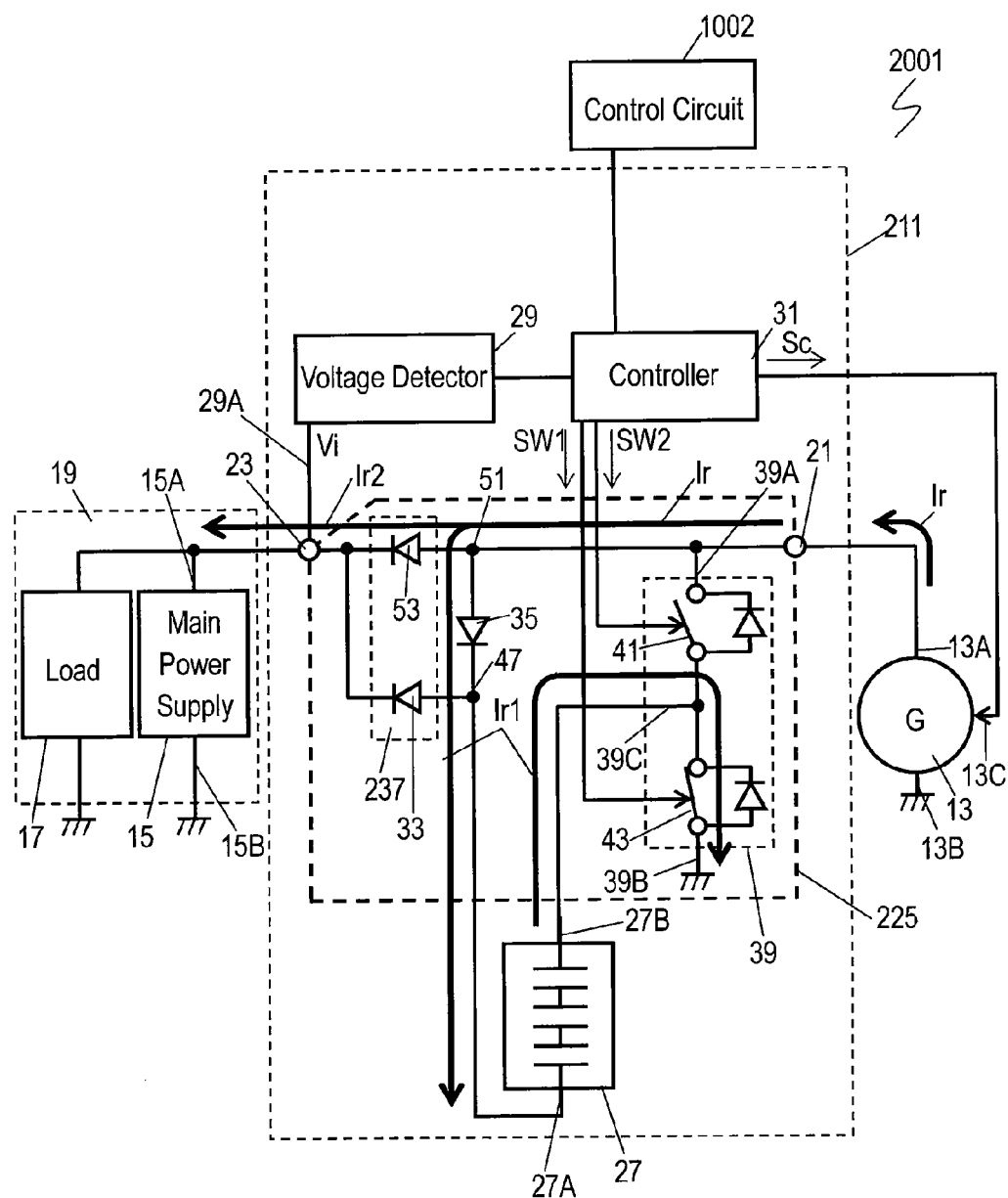
FIG. 6 is a block circuit diagram of the power supply device in accordance with Embodiment 2 while an electric storage element of the power supply device is charged.

First, an operation for storing, in electric storage element 27, electric power generated by power generator 13 by regenerative braking of an automobile as apparatus 1001 will be described. FIG. 6 is a block circuit diagram of power supply device 211 when electric storage element 27 is charged. When a driver operates the brake of the automobile, control circuit 1002 transmits a deceleration signal to controller 31. Upon receiving the deceleration signal, controller 31 transmits control signals SW1 and SW2 to turn off switch 41 and to turn on switch 43. In other words, common port 39C of selector switch 39 is connected to branch port 39B and is disconnected from branch port 39A, and common port 39C is connected to a ground to which branch port 39B is connected. Thus, electric storage element 27 and power generator 13 are connected in parallel to each other via diode 35. Thus, controller 31 controls switching unit 225 such that selector switch 39 connects electric storage element 27 and power generator 13 in parallel to each other.

While common port 39C of selector switch 39 is connected to the ground, when the voltage of end 15A of main power supply 15 is higher than that of end 27A of electric storage element 27, a large current flows from main power supply 15 to electric storage element 27. This operation causes the voltage of main power supply 15 to drop, and prevents main power supply 15 from driving load 17. Further, electric storage element 27 is charged with the large current from main power supply 15, but is not charged with a regenerative current, which is a current generated by power generator 13 due to regenerative braking, and thus, cannot store the electric power generated by power generator 13 due to the regenerative braking. Current switcher 237 cut off a current supplied from main power supply 15 to electric storage element 27. Cathodes 33K and 53K of diodes 33 and 53 constituting current switcher 237 are connected to output port 23, i.e., main power supply 15, and anodes 33A and 53A of diodes 33 and 53 are connected to nodes 47 and 51, respectively. This arrangement restricts the current flowing from main power supply 15 to electric storage element 27 into substantially zero. Current switcher 237 is implemented not only by diodes 33 and 53, but also by a semiconductor switch or a bidirectional DC/DC converter that can restrict the current flowing from main power supply 15 to electric storage element 27.

As shown in FIG. 6, regenerative current Ir generated by power generator 13 due to regenerative braking flows from power generator 13 to node 51 via input port 21 and diode 35. The maximum value of regenerative current Ir is determined by the capacity of power generator 13. When common port 39C of selector switch 39 is connected to the ground, current Ir1 which as a part of regenerative current Ir flows to electric storage element 27 via diode 35 to charge electric storage element 27, and is stored in electric storage element 27. When electric storage element 27 is not charged sufficiently, the voltage of electric storage element 27 is lower than that of main power supply 15, and turns off diodes 33 and 53. Therefore, substantially all of regenerative current Ir flows to electric storage element 27 (Ir=Ir1) to charge electric storage element 27, and does not flow to main power supply 15 or load 17 of parallel assembly 19. At this moment, a stable voltage is supplied to load 17 from main power supply 15. When electric storage element 27 is charged sufficiently, the voltage of end 27A of electric storage element 27 increases, and the voltage of node 51 becomes higher than that of main power supply 15 by the forward voltage drop of diode 53. At this moment, current Ir1, a part of regenerative current Ir, flows in electric storage element 27 to charge electric storage element 27, and current Ir2 (=Ir−Ir1) which is the remaining part of regenerative current Ir flows from node 51 to main power supply 15 and load 17 of parallel assembly 19 via diode 33 and output port 23.

Figure 7:
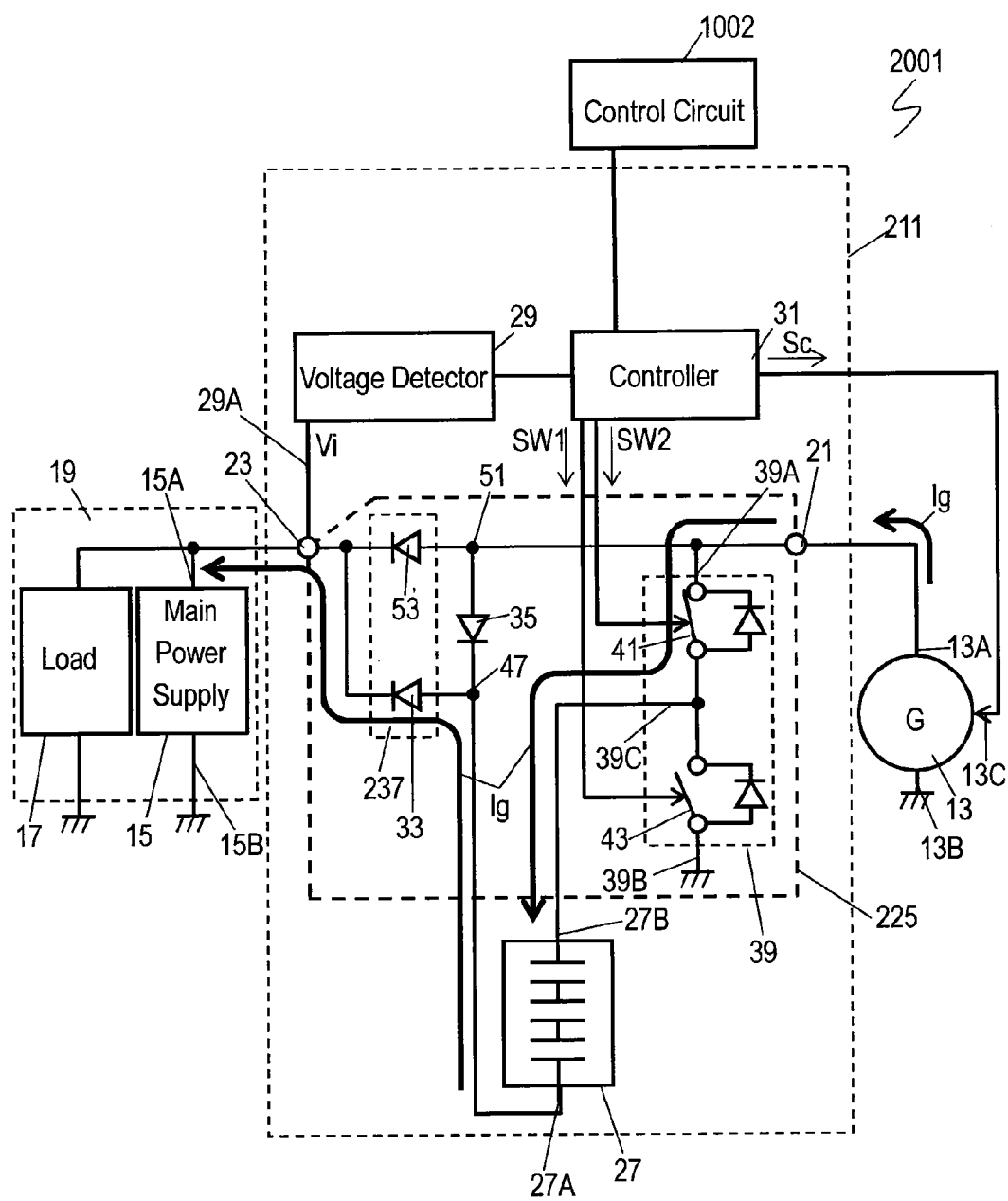
FIG. 7 is a block circuit diagram of the power supply device in accordance with Embodiment 2 while the electric storage element of the power supply device is discharged.

Next, an operation of power supply device 211 for supplying the electric power stored in electric storage element 27 to parallel assembly 19 when the regenerative braking of the automobile as apparatus 2001 terminates will be described below. FIG. 7 is a block circuit diagram of power supply device 211 discharging electric storage element 27. When the driver releases the brake and operates the accelerator to accelerate the automobile, control circuit 1002 transmits an acceleration signal to controller 31. Upon receiving the acceleration signal, controller 31 transmits control signals SW1 and SW2 to turn on switch 41 and to turn off switch 43. In other words, common port 39C of selector switch 39 is connected to branch port 39A and is disconnected from branch port 39B, and common port 39C is connected to input port 21 to which branch port 39A is connected. Thus, electric storage element 27 and power generator 13 are connected in series to each other. Thus, controller 31 controls switching unit 225 such that selector switch 39 connects electric storage element 27 and power generator 13 in series to each other.

When electric storage element 27 is charged and stores electric power, the voltage of end 27A of electric storage element 27 is higher than that of end 27B, hence turning off diode 35. Therefore, as shown in FIG. 7, power generation current Ig which is the current generated by power generator 13 driven by the engine during acceleration flows to electric storage element 27 via input port 21 and switch 41. Electric storage element 27 is charged with regenerative current Ir (Ir1) shown in FIG. 6 and is connected to power generator 13 in series, so that power generation current Ig flows also to electric storage element 27, and electric storage element 27 is discharged. Power generation current Ig is supplied to main power supply 15 and load 17 of parallel assembly 19 via diode 33 and output port 23. Controller 31 transmits control signal Sc to power generator 13 to control power generator 13 such that the voltage of output port 23 detected by voltage detector 29 becomes a voltage, e.g. 14V, slightly higher than the rated voltage of main power supply 15. Thus, controller 31 can protects load 17 from receiving a voltage exceeding an allowable voltage of load 17.

Controller 31 controls power generator 13 such that the voltage of output port 23 is a predetermined voltage. Hence, when the voltage between ends 27A and 27B of electric storage element 27 is not zero upon electric storage element 27 being charged, controller 31 decreases the voltage of power generator 13 accordingly. This operation reduces energy required for driving power generator 13, and reduces a load on the engine, accordingly reducing energy consumed by the entire automobile as apparatus 1001. Executing this operation particularly during the acceleration that applies a large load on the engine, the power supply device improves efficiency of the engine and reduces energy consumption significantly. At this moment, the voltage of input port 21, i.e., the voltage of power generator 13, is lower than the voltage of node 47, hence turning off diodes 35 and 53. Therefore, power generation current Ig from power generator 13 is not supplied to parallel assembly 19 via diode 35 or 53.

Thus, when electric storage element 27 is charged with the current generated by power generator 13, switching unit 225 connects electric storage element 27, power generator 13, and parallel assembly 19 in parallel to each other. When electric storage element 27 is discharged to supply the electric power stored in electric storage element 27 to parallel assembly 19, switching unit 25 connects electric storage element 27, power generator 13, and parallel assembly 19 in series to each other.

Figure 8A:
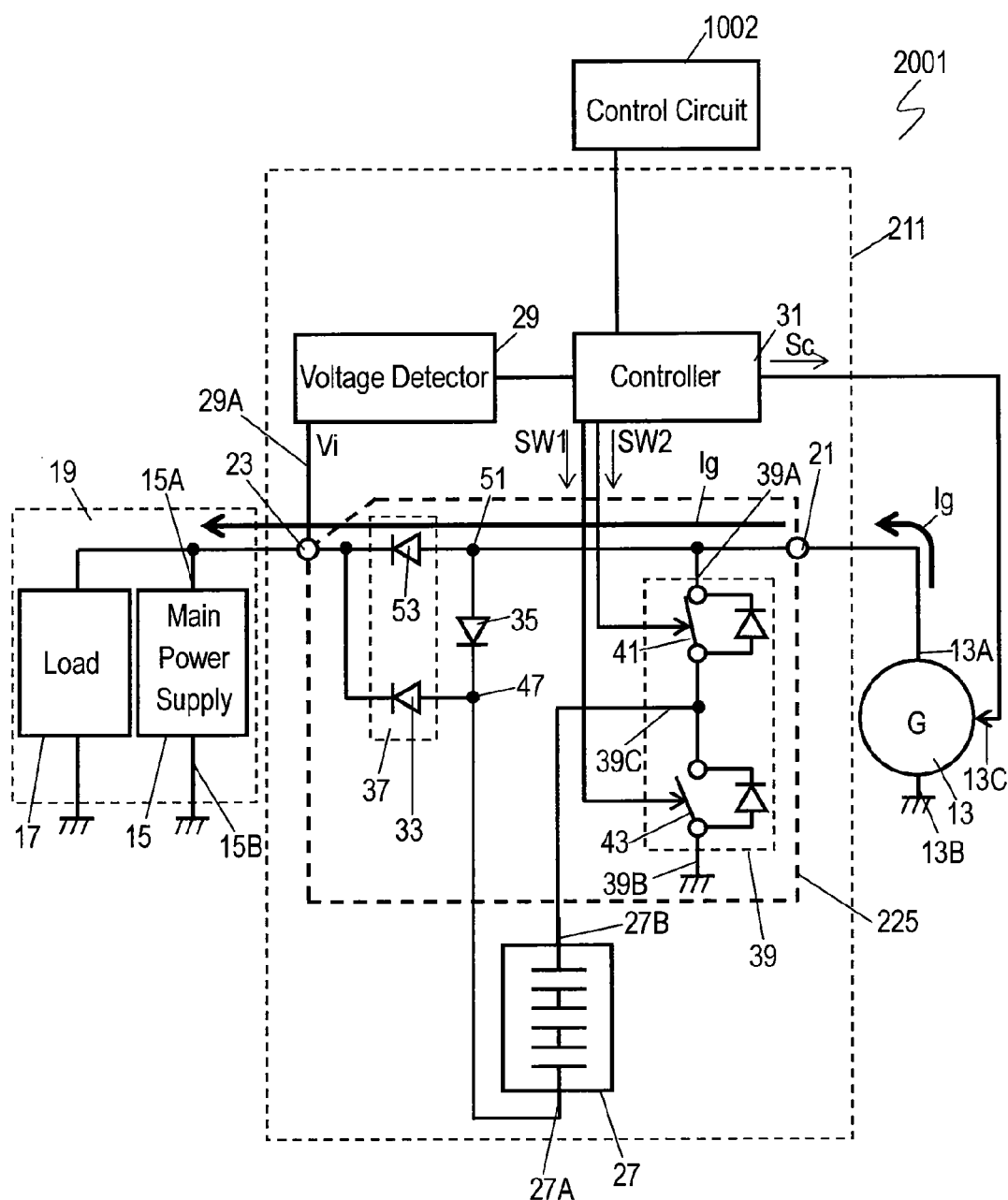
FIG. 8A is a block circuit diagram of the power supply device in accordance with Embodiment 2 while the electric storage element of the power supply device is neither charged nor discharged

FIG. 8A is a block circuit diagram of power supply device 211 for neither charging nor discharging electric storage element 27. Since the voltage of electric storage element 27 decreases as discharge, controller 31 increases the voltage of power generator 13 such that the voltage of output port 23 becomes the predetermined voltage. Even when electric storage element 27 discharges to lose the stored electric power, controller 31 controls power generator 13 such that the voltage of output port 23 becomes the predetermined voltage. Therefore, the voltage of input port 21, i.e., node 51, becomes higher than that of output port 23, and turns on diode 53, as shown in FIG. 8A. At this moment, as shown in FIG. 8A, power generation current Ig from power generator 13 is supplied to main power supply 15 and load 17 of parallel assembly 19 via input port 21, diode 53, and output port 23 without passing through electric storage element 27, thus neither charging nor discharging electric storage element 27. Power generation current Ig flows to parallel assembly 19 via power supply device 211 while the voltage of output port 23 becomes lower than that of input port 21 by the forward voltage of diode 53. At this moment, similarly to an ordinary automobile which does not include power supply device 211, power generator 13 supplies the electric power to load 17 while charging main power supply 15 in apparatus 2001. At this moment, controller 31 can transmit control signals SW1 and SW2 to selector switch 39 to turn off both switches 41 and 42.

In power supply device 211 shown in FIG. 8A for neither charging nor discharging electric storage element 27, power generation current Ig flows via diode 53 when electric storage element 27 is neither charged nor discharged, and the voltage of output port 23 is lower than that of input port 21 by the forward voltage of diode 53. In power supply device 11 shown in FIG. 4A according to Embodiment 1 inc which electric storage element 27 is neither charged nor discharged, power generation current Ig flows via diodes 33 and 35 when electric storage element 27 is neither being charged nor discharged, and the voltage of output port 23 is lower than that of input port 21 by the sum of the forward voltages of diodes 33 and 35. Thus, the difference between the voltage of input port 21 and that of output port 23 in power supply device 211 according to Embodiment 2 is reduced to about a half the difference between the voltage of input port 21 and that of output port 23 in power supply device 11 according to Embodiment 1. Therefore, loss of power supply device 211 is reduced. The automobile as apparatus 2001 operates for the longest time with the circuit shown in FIG. 8A out of the circuits shown in FIGS. 6 to 8A. Therefore, reducing the loss in the circuit shown in FIG. 8A provides further energy-saving of apparatus 2001.

Thus, while controller 31 controls the output voltage of power generator 13 such that the voltage detected by voltage detector 29 becomes the predetermined voltage, controller 31 controls switching unit 25 to connect electric storage element 27 to power generator 13 in parallel so as to store the electric power from power generator 13 in electric storage element 27, controls switching unit 25 such that electric storage element 27 is connected to power generator 13 in series so as to supply the electric power stored in electric storage element 27 to main power supply 15 and load 17. Thus, power supply device 211 can adds a regenerating function to apparatus 2001 including only single power generator 13 regardless of charge and discharge of electric storage element 27. Power supply device 211 according to Embodiment 2 saves energy consumed by apparatus 2001 more than power supply device 11 according to Embodiment 1.

Figure 8B:
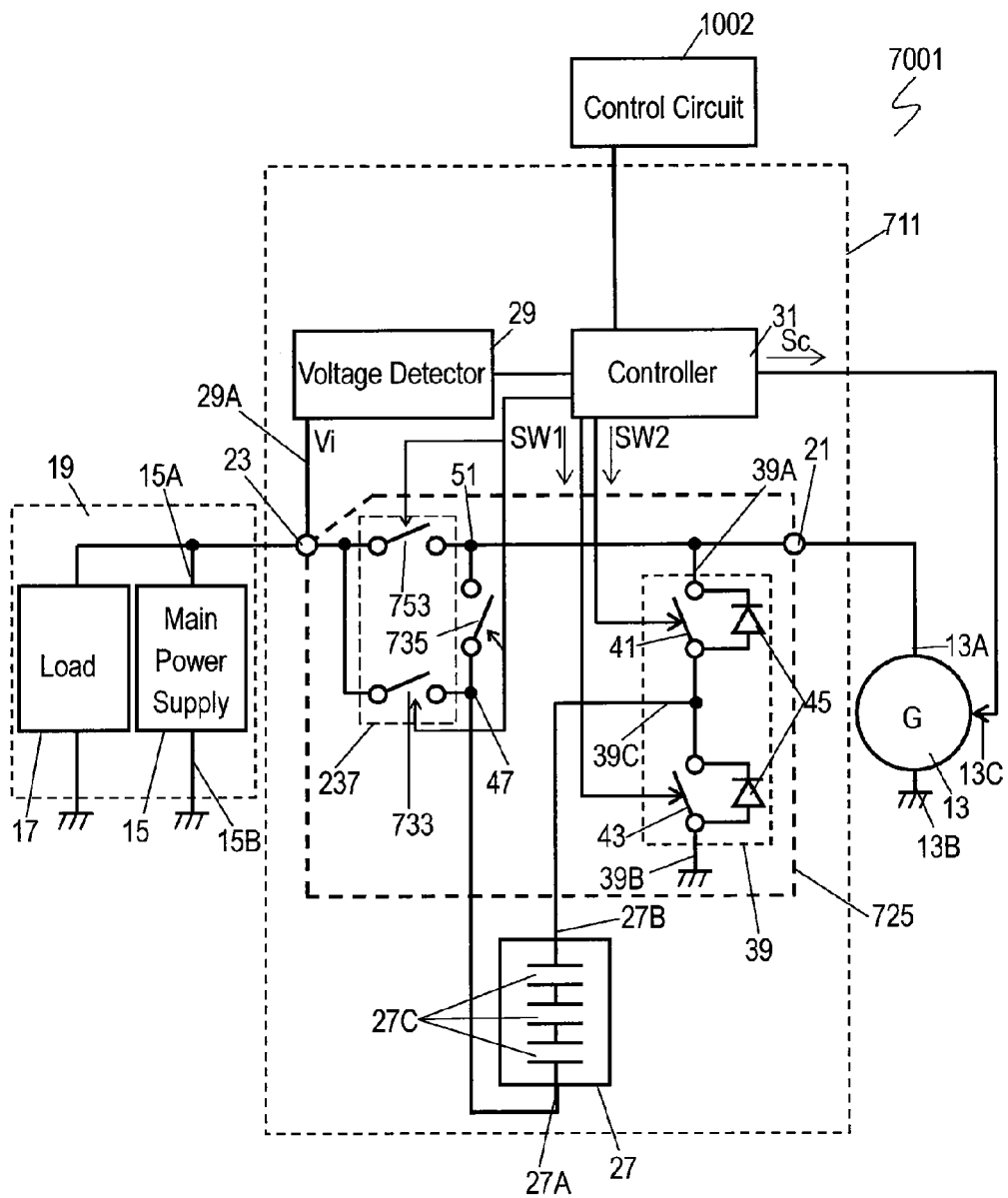
FIG. 8B is a block circuit diagram of an apparatus including another power supply device in accordance with Embodiment 2.

FIG. 8B is a block circuit diagram of apparatus 7001 including another power supply device 711 according to Embodiment 2. In FIG. 8B, components identical to those of apparatus 2001 shown in FIG. 5 are denoted by the same reference numerals, and their description will be omitted. In power supply device 211 according to Embodiment 2 of FIG. 5, diodes 33, 35, and 53 are turned on and off according to the voltages of input port 21, output port 23, and node 47. Power supply device 711 shown in FIG. 8B includes switches 733, 735, and 753 that are turned on and off by controller 31, instead of diodes 33, 35, and 53 of power supply device 211 shown in FIG. 2. In other words, switch 733 is controlled by controller 31 such that switch 733 is turned on when the voltage of output port 23 is lower than that of node 47, and switch 733 is turned off when the voltage of output port 23 is higher than that of node 47. Switch 735 is controlled by controller 31 such that that switch 735 is turned on when the voltage of node 47 is lower than that of input port 21, and switch 735 is turned off when the voltage of node 47 is higher than that of input port 21. Switch 753 is controlled by controller 31 such that switch 753 is turned on when electric storage element 27 is not discharged and the voltage of input port 21 is higher than that of output port 23, and switch 753 is turned off when the voltage of input port 21 is lower than that of output port 23. While diodes 33, 35, and 53 have forward voltage drops, switches 733, 735, and 753 can reduces the voltage drops significantly, accordingly allowing the voltage generated by power generator 13 to be reduced. This arrangement reduces the load on power generator 13, and further saves energy consumed by apparatus 2001. In power supply device 711 shown in FIG. 8B, all of diodes 33, 35, and 53 of power supply device 21 shown in FIG. 5 are replaced by switches 733, 735, and 753, respectively. However, at least one of diodes 733, 735, and 753 can be replaced by a switch. Each of switches 733, 735, and 753 can be implemented by a semiconductor switch, such as an FET, similarly to switches 41 and 43, or by a mechanical switch, such as a relay. The FET is connected so that the polarity of the parasitic diode of the FET is directed identically to the polarity of each of diodes 33, 35, and 53.

Exemplary Embodiment 3

Figure 9:
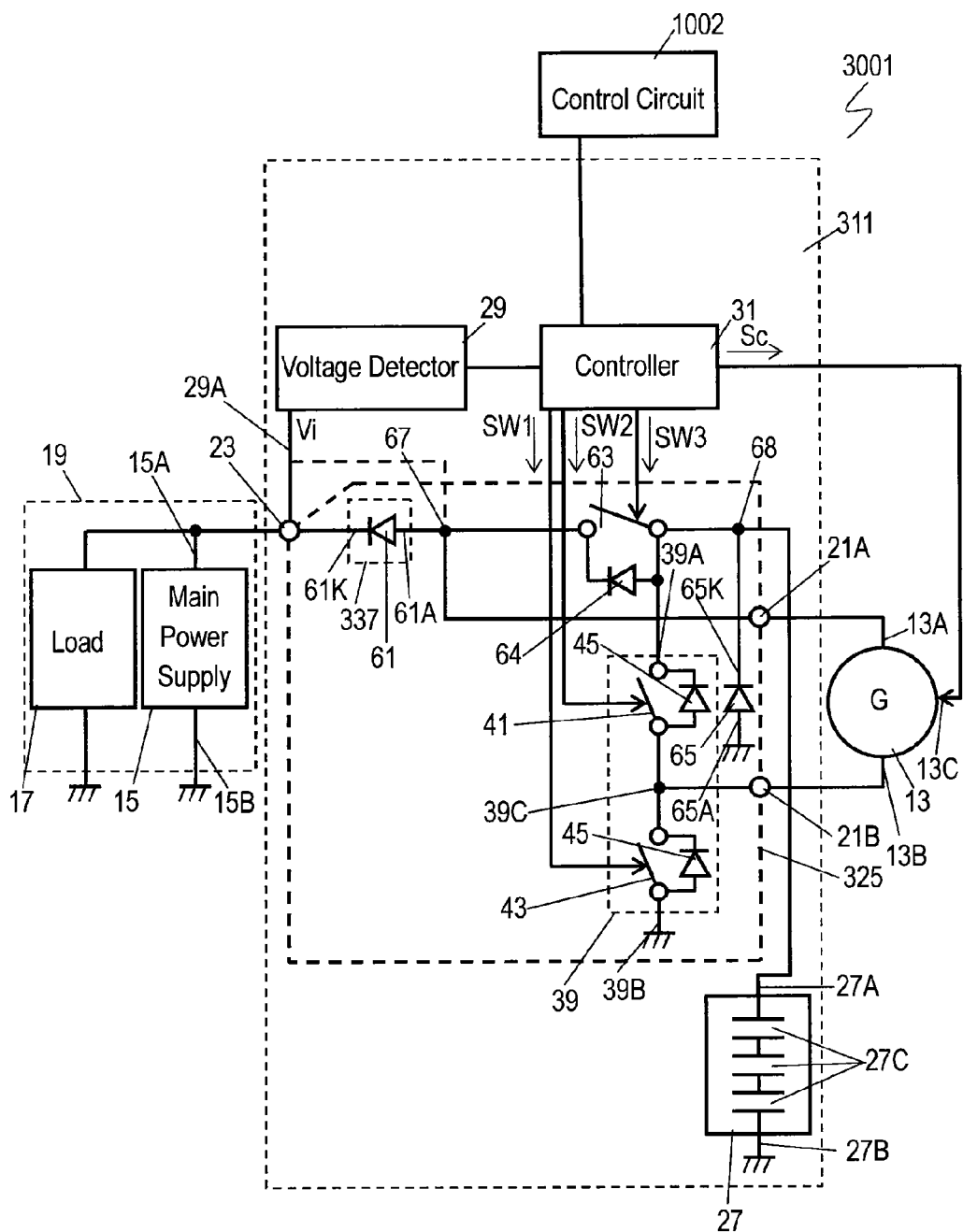
FIG. 9 is a block circuit diagram of a power supply device in accordance with Exemplary Embodiment 3 of the invention.

FIG. 9 is a block circuit diagram of apparatus 3001 including power supply device 311 in accordance with Exemplary Embodiment 3 of the present invention. In FIG. 9, components identical to those of apparatus 1001 according to Embodiment 1 shown in FIG. 1 are denoted by the same reference numerals, and their description will be omitted. Power supply device 311 includes diodes 61 and 65, charging switch 63, and input ports 21A and 21B, instead of diodes 33 and 35, and input port 21 of power supply device 11 according to Embodiment 1 shown in FIG. 1.

Input ports 21A and 21B are connected to output terminals 13A and 13B of power generator 13, respectively. Common port 39C of selector switch 39 is connected to input port 21B, and branch port 39B is connected to a ground. Anode 61A of diode 61 is connected to input port 21A at node 67, and cathode 61K is connected to output port 23. Diode 65 is connected to electric storage element 27 in parallel such that cathode 65K and anode 65A of diode 65 are connected to ends 27A and 27B of electric storage element 27, respectively, that is, anode 65A of diode 65 is connected to the ground. Cathode 65K is connected to end 27A of electric storage element 27 at node 68. Charging switch 63 is connected in series between nodes 67 and 68, and connects node 67 to node 68 and disconnects node 67 from node 68. Controller 31 transmits control signal SW3 to charging switch 63 to turn on and off charging switch 63. Charging switch 63 is implemented by a field effect transistor (FET) having parasitic diode 64, similarly to switches 41 and 43. Charging switch 63 is connected such that the cathode and anode of parasitic diode 64 are connected to nodes 67 and 68, respectively. Diode 61 functions as current switcher 337 that cut off the current flowing from main power supply 15 to electric storage element 27. Similarly to power supply device 11 according to Embodiment 1, in power supply device 311, detecting port 29A of voltage detector 29 is connected to output port 23, and detects the voltage of output port 23. Similarly to the detection of the voltage of node 47 in power supply device 11 according to Embodiment 1, in power supply device 311, detecting port 29A may be connected to node 67 other than output port 23, and may detect the voltage of node 67.

An operation of apparatus 3001 including power supply device 311 will be described below.

Figure 10:
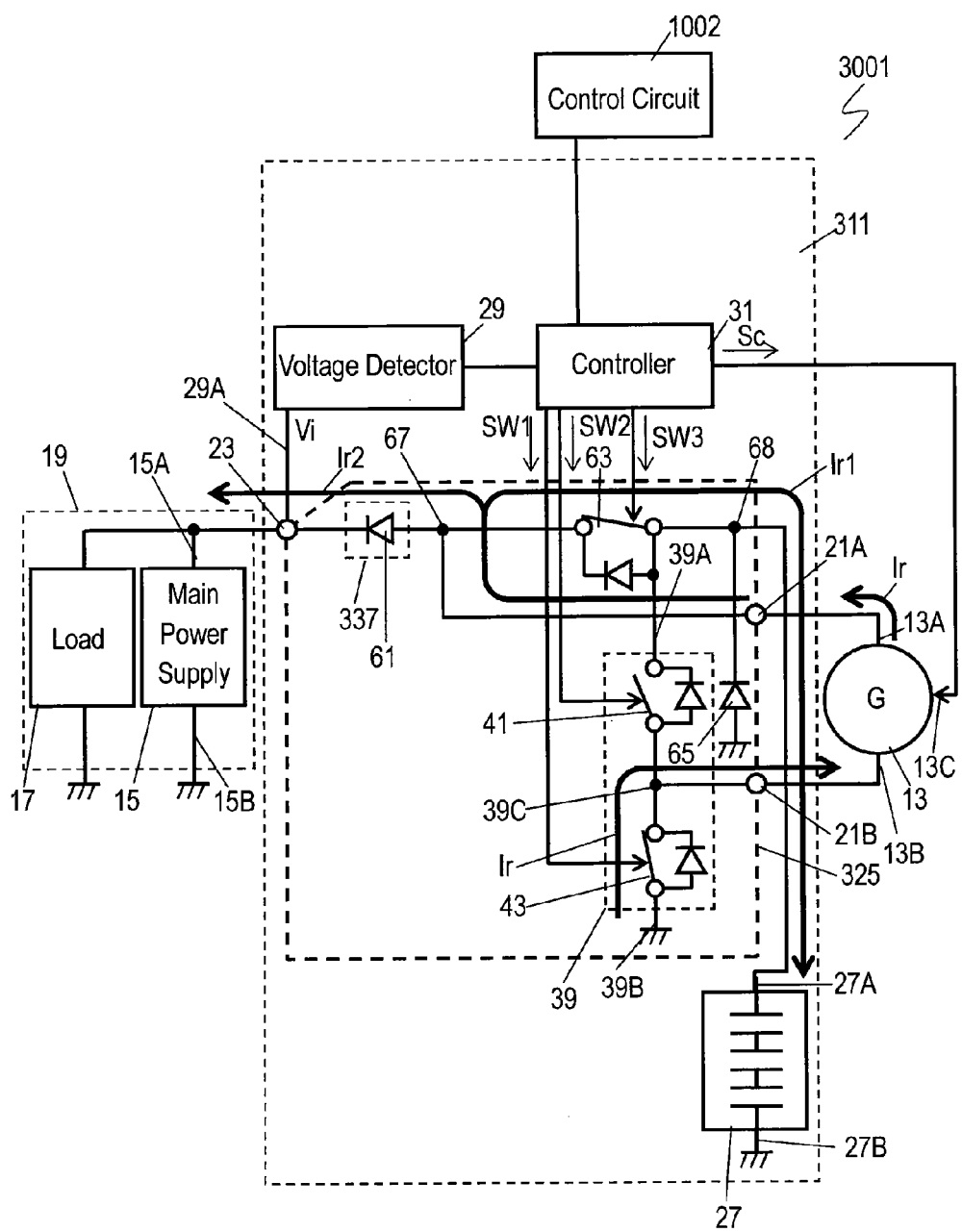
FIG. 10 is a block circuit diagram of the power supply device in accordance with Embodiment 3 while an electric storage element of the power supply device is charged.

First, an operation for storing, in electric storage element 27, electric power generated by power generator 13 sue to regenerative braking of an automobile as apparatus 3001 will be described. FIG. 10 is a block circuit diagram of power supply device 311 for charging electric storage element 27. When a driver operates the brake of the automobile, control circuit 1002 transmits a deceleration signal to controller 31. Upon receiving the deceleration signal, controller 31 transmits control signals SW1 and SW2 to turn off switch 41 and to turn on switch 43. In other words, common port 39C of selector switch 39 is connected to branch port 39B and is disconnected from branch port 39A, and common port 39C is connected to the ground to which branch port 39B is connected. Controller 31 transmits control signal SW3 to charging switch 63 to turn on charging switch 63, thereby connecting nodes 67 and 68. Thus, electric storage element 27 and power generator 13 are connected in parallel via charging switch 63. Thus, controller 31 controls switching unit 325 such that selector switch 39 connects electric storage element 27 and power generator 13 in parallel to each other.

While common port 39C of selector switch 39 is connected to the ground, when the voltage of end 15A of main power supply 15 is higher than that of end 27A of electric storage element 27, a large current flows from main power supply 15 to electric storage element 27. This operation causes the voltage of main power supply 15 to drop, hence preventing main power supply 15 from driving load 17. Furthermore, electric storage element 27 is charged with the large current from main power supply 15, and is not charged with a regenerative current which is a current generated by power generator 13 due to regenerative braking, thus being prevented from storing electric power generated by power generator 13 due to regenerative braking. Current switcher 337 cut off the current supplied from main power supply 15 to electric storage element 27. Cathode 61K of diode 61 constituting current switcher 337 is connected to output port 23, i.e., main power supply 15, anode 61A is connected to node 67. This arrangement restricts the current flowing from main power supply 15 to electric storage element 27 into substantial zero. Current switcher 337 is implemented not only by diode 61 but also by a semiconductor switch or a DC/DC converter that can restrict the current flowing from main power supply 15 to electric storage element 27.

As shown in FIG. 10, output terminal 13B of power generator 13 is connected to the ground via switch 43 of selector switch 39. Power generator 13 generates a voltage due to regenerative braking so that the voltage of output terminal 13A is higher than that of output terminal 13B. Regenerative current Ir generated by power generator 13 due to regenerative braking flows from output terminal 13A of power generator 13 to node 67 via input port 21A, and flows from the ground to output terminal 13B of power generator 13 via branch port 39B and common port 39C of selector switch 39. The maximum value of regenerative current Ir is determined by the capacity of power generator 13. Charging switch 63 which is turned on allows current Ir1 which is a part of regenerative current Ir to flow to electric storage element 27 to charge electric storage element 27, thus allowing electric storage element 27 to store current Ir1. When electric storage element 27 is not charged sufficiently, the voltage of electric storage element 27 is lower than that of main power supply 15, hence turning off diode 61. Therefore, substantially all of regenerative current Ir flows to electric storage element 27 (Ir=Ir1) to charge electric storage element 27, and does not flow to main power supply 15 or load 17 of parallel assembly 19. At this moment, a stable voltage is supplied to load 17 from main power supply 15. When electric storage element 27 is charged sufficiently and the voltage of end 27A of electric storage element 27 becomes higher than that of end 15A of main power supply 15 by the forward voltage of diode 61, current Ir1 which is a part of regenerative current Ir flows in electric storage element 27 to charge electric storage element 27, and current Ir1 (=Ir−Ir1) which is the remaining part of regenerative current Ir flows from node 67 to main power supply 15 and load 17 of parallel assembly 19 via diode 61 and output port 23.

Figure 11:
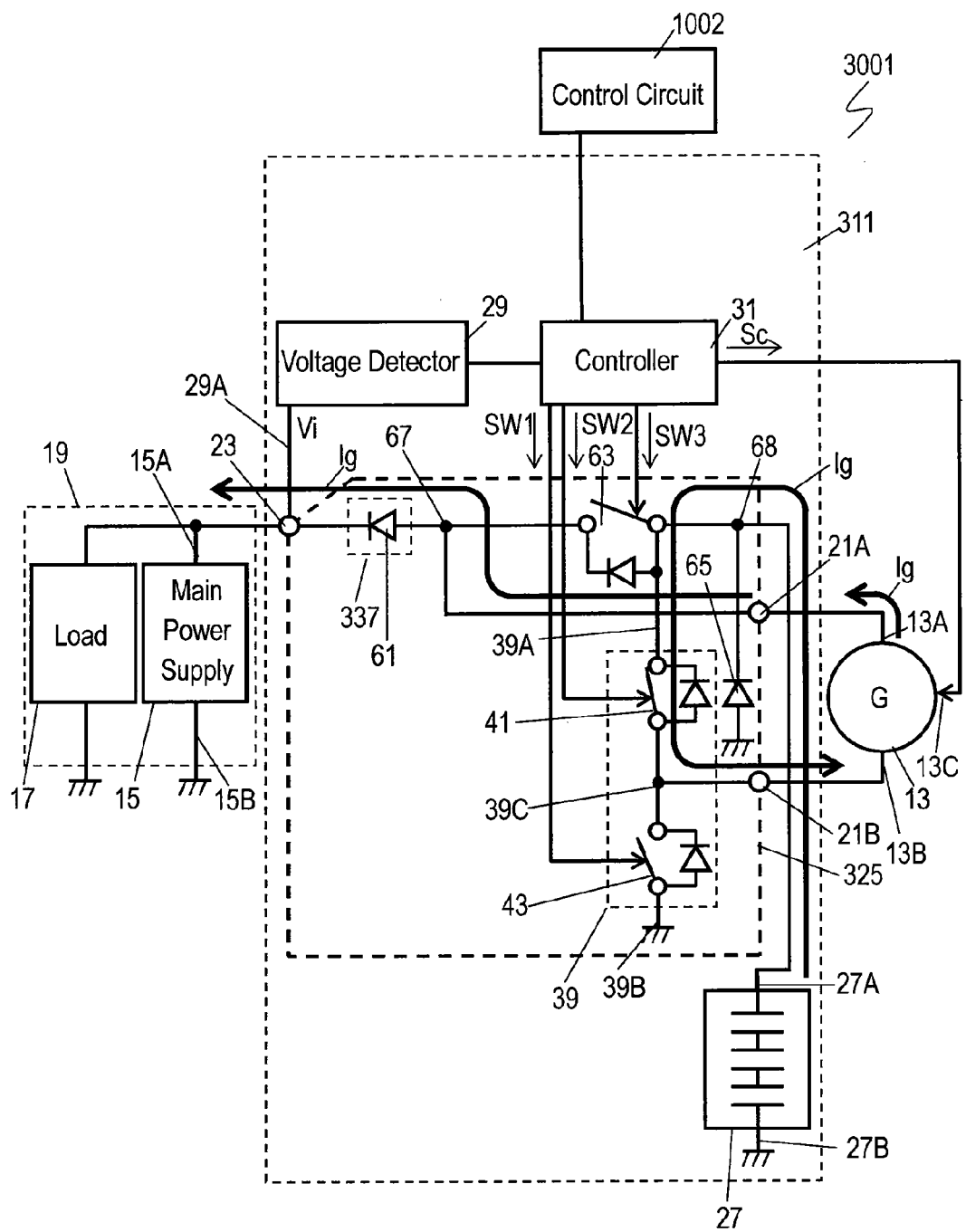
FIG. 11 is a block circuit diagram of the power supply device in accordance with Embodiment 3 while the electric storage element of the power supply device is discharged.

Next, an operation of power supply device 311 for supplying the electric power stored in electric storage element 27 to parallel assembly 19 when the regenerative braking of the automobile as apparatus 3001 terminates will be described below. FIG. 11 is a block circuit diagram of power supply device 311 for discharging electric storage element 27. When the driver releases the brake and operates the accelerator to accelerate the automobile, control circuit 1002 transmits an acceleration signal indicating the acceleration of the automobile to controller 31. Upon receiving the acceleration signal, controller 31 transmits control signals SW1 and SW2 to turn on switch 41 and to turn off switch 43. In other words, common port 39C of selector switch 39 is connected to branch port 39A and is disconnected from branch port 39B, and common port 39C is connected to node 68 to which branch port 39A is connected. At this moment, controller 31 transmits control signal SW3 to turn off charging switch 63 to disconnect nodes 67 from node 68. Thus, electric storage element 27 and power generator 13 are connected via switch 41 in series to each other. Thus, controller 31 controls switching unit 325 such that selector switch 39 connects electric storage element 27 and power generator 13 in series to each other. In power supply device 11 according to Embodiment 1 shown in FIG. 3, the ground, power generator 13, and electric storage element 27 are connected in series in this order. In power supply device 311 according to Embodiment 3 shown in FIG. 11, the ground, electric storage element 27, and power generator 13 are connected in series in this order.

When electric storage element 27 supplies the stored electric power to parallel assembly 19, the current from electric storage element 27 flows to output terminal 13B of power generator 13 via switch 41 and input port 21B. Power generator 13 is driven by the engine during the acceleration, and generates power generation current Ig, so that the current from electric storage element 27 is supplied as power generation current Ig to main power supply 15 and load 17 of parallel assembly 19 via input port 21A, node 67, diode 61, and output port 23. The voltage of output port 23 is detected by voltage detector 29. Controller 31 transmits control signal Sc to power generator 13 to control the voltage between output terminals 13A and 13B so that the detected voltage of output port 23 becomes a predetermined voltage. Thus, controller 31 protects load 17 from receiving a voltage exceeding an allowable voltage of load 17.

Controller 31 controls power generator 13 such that the voltage of output port 23 becomes the predetermined voltage. When the voltage between ends 27A and 27B of charged electric storage element 27 is not zero, controller reduces the voltage of power generator 13 accordingly. This operation reduces energy required for driving power generator 13, so that a load on the engine is reduced and energy consumed by the entire automobile as apparatus 1001 can be reduced. Executing this operation particularly during the acceleration that applies a large load on the engine, the power supply device improves efficiency of the engine, and reduces the consumed energy significantly. When electric storage element 27 is discharged to reduce the stored electric power, power generation current Ig flows in electric storage element 27 from end 27B to end 27A, and hence the voltage of end 27A of electric storage element 27 drops. When the voltage of end 27A becomes lower than the forward voltage of diode 65 turning on, diode 65 is turned on to allow power generation current Ig to flow via diode 65 but not to flow via electric storage element 27. Therefore, the voltage lower than the negative voltage having the absolute value of the forward voltage of diode 65 is not applied to end 27A of electric storage element 27, hence preventing electric storage element 27 from deteriorating due to over-discharge.

Controller 31 can detect the completion of the discharge of electric storage element 27 by monitoring control signal Sc. When the discharge of electric storage element 27 is completed, the voltage between ends 27A and 27B of electric storage element 27 becomes minimum, and controller 31 controls power generator 13 such that the voltage of output port 23 is maintained at the predetermined voltage only by power generator 13. At a normal state where electric storage element 27 is discharged completed and stores no electric power, the automobile operates for a longer time. Controller 31 stores control signal Sc at this normal state as reference control signal Sref. Controller 31 detects that control signal Sc becomes equal to reference control signal Sref to detects the completion of the discharge of electric storage element 27.

Thus, when electric storage element 27 is charged with the current generated by power generator 13, switching unit 325 connects electric storage element 27, power generator 13, and parallel assembly 19 in parallel to each other. When electric storage element 27 is discharged to supply the electric power stored by electric storage element 27 to parallel assembly 19, switching unit 25 is operable to connect electric storage element 27, power generator 13, and parallel assembly 19 in series to each other.

Figure 12A:
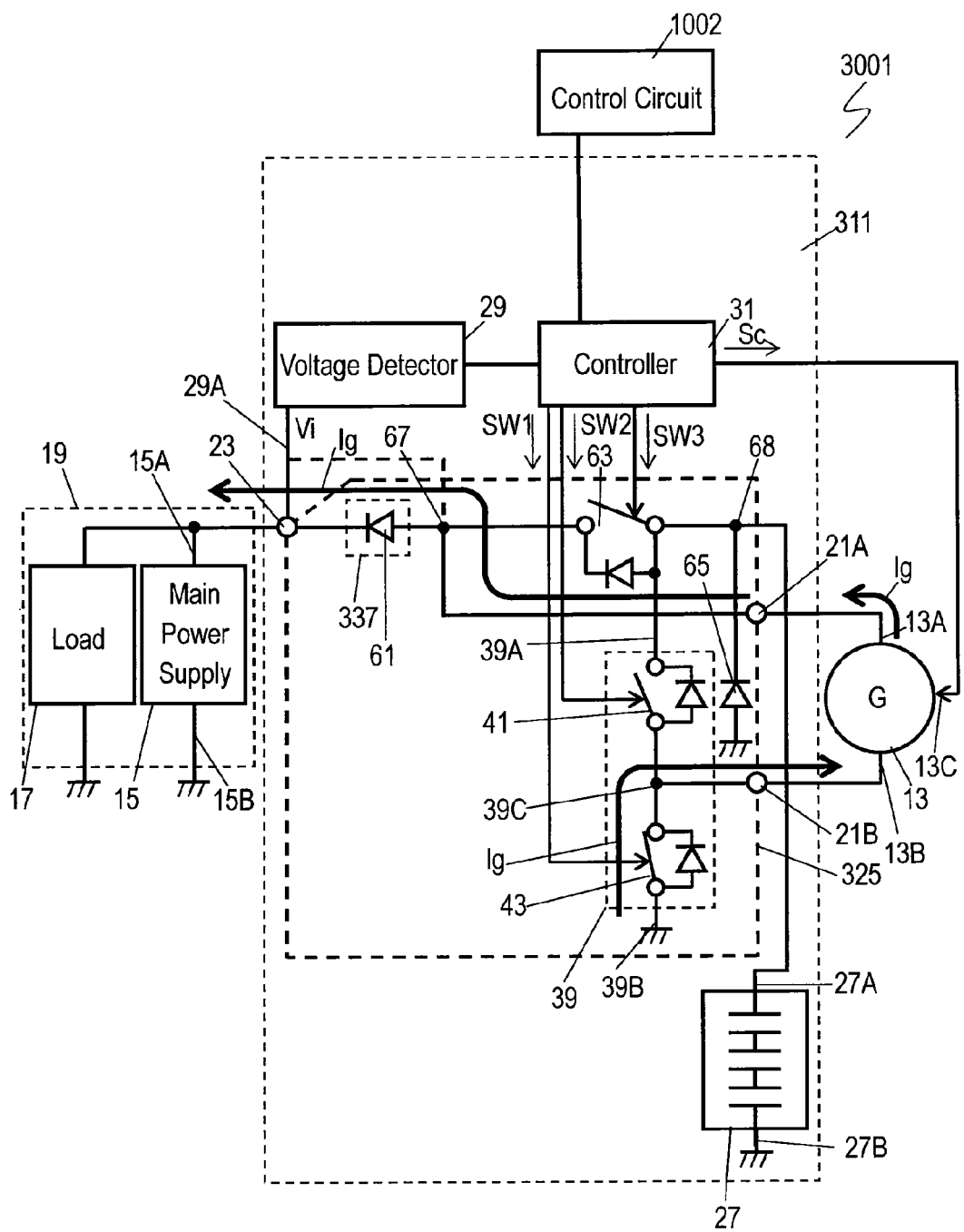
FIG. 12A is a block circuit diagram of the power supply device in accordance with Embodiment 3 while the electric storage element of the power supply device is neither charged nor discharged.

FIG. 12A is a block circuit diagram of power supply device 311 including electric storage element 27 which is neither being charged nor discharged. When controller 31 detects the completion of the discharge of electric storage element 27 by the above method, controller 31 transmits control signals SW1 and SW2 to selector switch 39 to turn on switch 43 and to turn off switch 41, thus connecting common port 39C to branch port 39B and disconnecting common port 39C from branch port 39A. Thus, common port 39C is connected to the ground. At this moment, controller 31 transmits control signals SW3 to continue turning off charging switch 63 to disconnect node 68 from node 67.

As shown in FIG. 12A, output terminal 13B of power generator 13 is connected to the ground via selector switch 39. Therefore, power generation current Ig flowing from output terminal 13A of power generator 13 is supplied to main power supply 15 and load 17 of parallel assembly 19 via input port 21A, node 67, diode 61, and output port 23. In this circuit, single diode 61 is connected in series between input port 21A and output port 23, so that the loss in power supply device 311 can be smaller than that of power supply device 11 according to Embodiment 1 including two diodes 33 and 35 connected in series between input port 21 and output port 23. Thus, the device shown in FIG. 12A saves energy consumed by apparatus 3001.

In power supply device 311 according to Embodiment 3, electric storage element 27 and power generator 13 are connected in series in an order reverse to that of power supply devices 11 and 211 according to Embodiments 1 and 2. Thus, power supply device 311 can add a regenerating function to apparatus 3001 including only single power generator 13 regardless of charge and discharge of electric storage element 27.

Figure 12B:
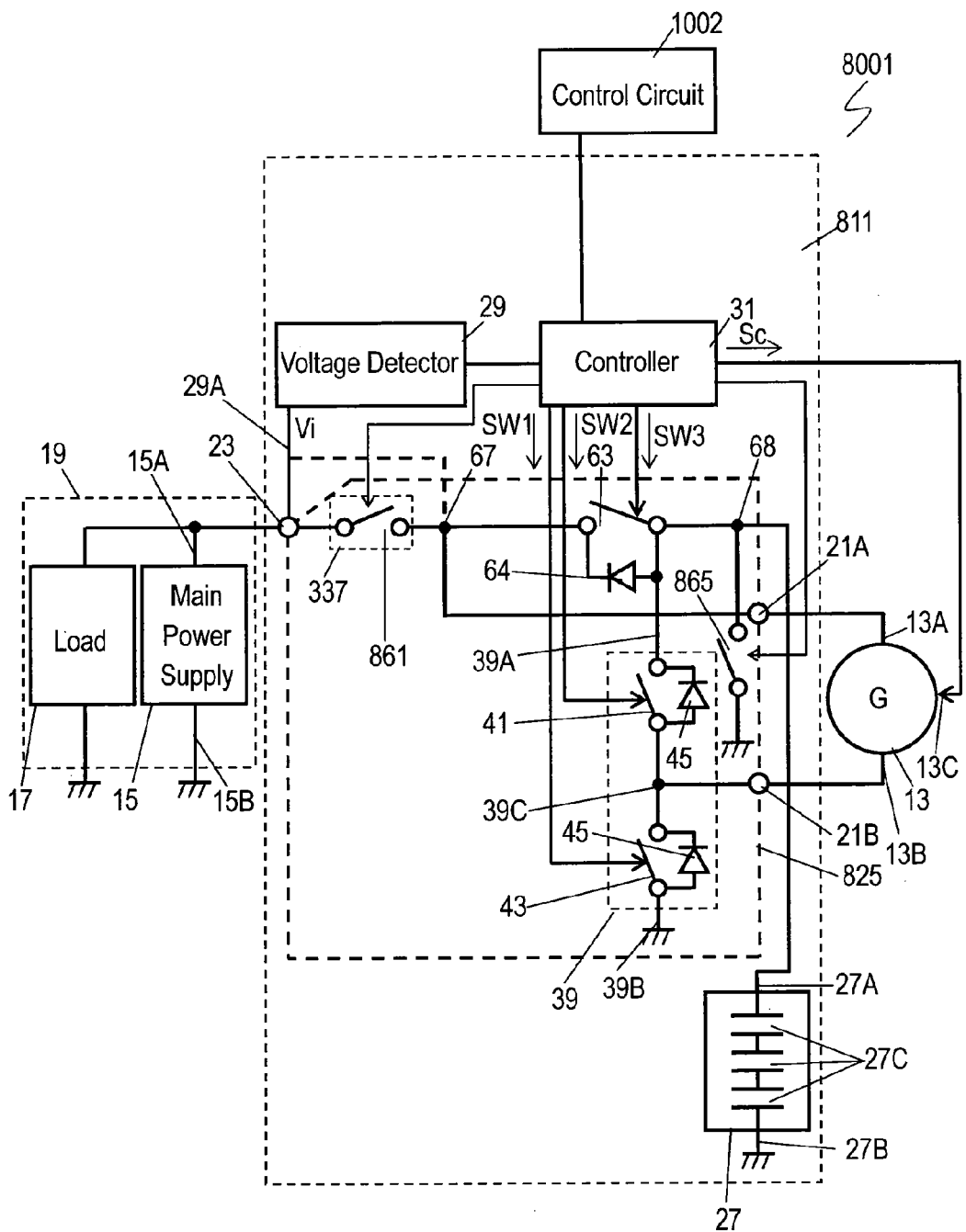
FIG. 12B is a block circuit diagram of an apparatus including another power supply device in accordance with Embodiment 3.

FIG. 12B is a block circuit diagram of apparatus 8001 including another power supply device 811 according to Embodiment 3. In FIG. 12B, components identical to those of apparatus 3001 shown in FIG. 9 are denoted by the same reference numerals, and their description will be omitted. In power supply device 311 shown in FIG. 9, diodes 61 and 65 are turned on and off according to the voltages of input port 21A, output port 23, and node 67. Power supply device 811 shown in FIG. 12B includes switches 861 and 865 that are turned on and off by controller 31, instead of diodes 61 and 65 of power supply device 311 shown in FIG. 9. In other words, switch 861 is controlled by controller 31 such that switch 861 is turned on when the voltage of output port 23 is lower than that of node 67, switch 861 and is turned off when the voltage of output port 23 is higher than that of node 67. Switch 865 is controlled by controller 31 such that that switch 865 is turn on when the voltage of node 68 is lower than that of the ground, and switch 865 is turned off when the voltage of node 68 is higher than that of the ground. Each of diodes 61 and 65 has a forward voltage drop. Switches 864 and 865 significantly reduce the voltage drop, and allow the voltage generated by power generator 13 to be reduced accordingly, hence reducing a load on power generator 13 and saving energy consumed by apparatus 3001. In power supply device 811 shown in FIG. 12B, diodes 61 and 65 of power supply device 311 shown in FIG. 9 are replaced by switches 861 and 865, respectively. However, one of diodes 61 and 65 may be replaced by a switch. Each of switches 861 and 865 can be implemented by a semiconductor switch, such as an FET, similarly to switches 41 and 43, or by a mechanical switch, such as a relay. The FET is connected such that the polarity of a parasitic diode of the FET is connected identically to that of each of diodes 61 and 65. Controller 31 controls switches 41 and 43 such that switch 43 is turned on when the voltage of branch port 39B is lower than that of common port 39C, and switch 43 is turned off when the voltage of branch port 39B is higher than that of common port 39C, thereby eliminating switch 865 and diode 65.

According to Embodiments 1 to 3, selector switch 39 is implemented by two FETs functioning as two switches 41 and 43. Selector switch 39 can be implemented of relays each having a single-pole double-throw (SPDT) contact that has branch ports 39A and 39B and common port 39C selectively and exclusively connected to branch ports 39A and 39B.

In power supply devices 11, 211, and 311 according to Embodiments 1 to 3, the capacity of electric storage element 27 is determined to be a value capable of sufficiently storing the regenerative power. In other words, even if electric storage element 27 is fully charged with the regenerative power, the voltage between ends 27A and 27B of electric storage element 27 does not exceed the withstand voltage thereof. The number of electric double layer capacitors 27C (FIG. 1) of electric storage element 27 can be determined to be a value capable of charging it with only an average regenerative power. This arrangement increases the period when electric storage element 27 is fully charged to provide a high efficiency, and hence, reduces the size and cost of power supply devices 11, 211, and 311. Controller 31 may detect the voltage between ends 27A and 27B of electric storage element 27. In order to prevent the voltage of electric storage element 27 from exceeding the withstand voltage of electric storage element 27, the charging of electric storage element 27 is stopped even when the regenerative current flows. In power supply devices 11 and 211 according to Embodiments 1 and 2, controller 31 stops the charge of electric storage element 27 by turning off both switches 41 and 43. In power supply device 311 according to Embodiment 3, controller 31 stops the charge of electric storage element 27 by turning off charging switch 63. When electric storage element 27 is out of order, the above operation separates electric storage element 27 in power supply devices 11, 211, and 311 and only to allow power generator 13 to continue supplying power to main power supply 15 and load 17 of parallel assembly 19.

Figure 13A:
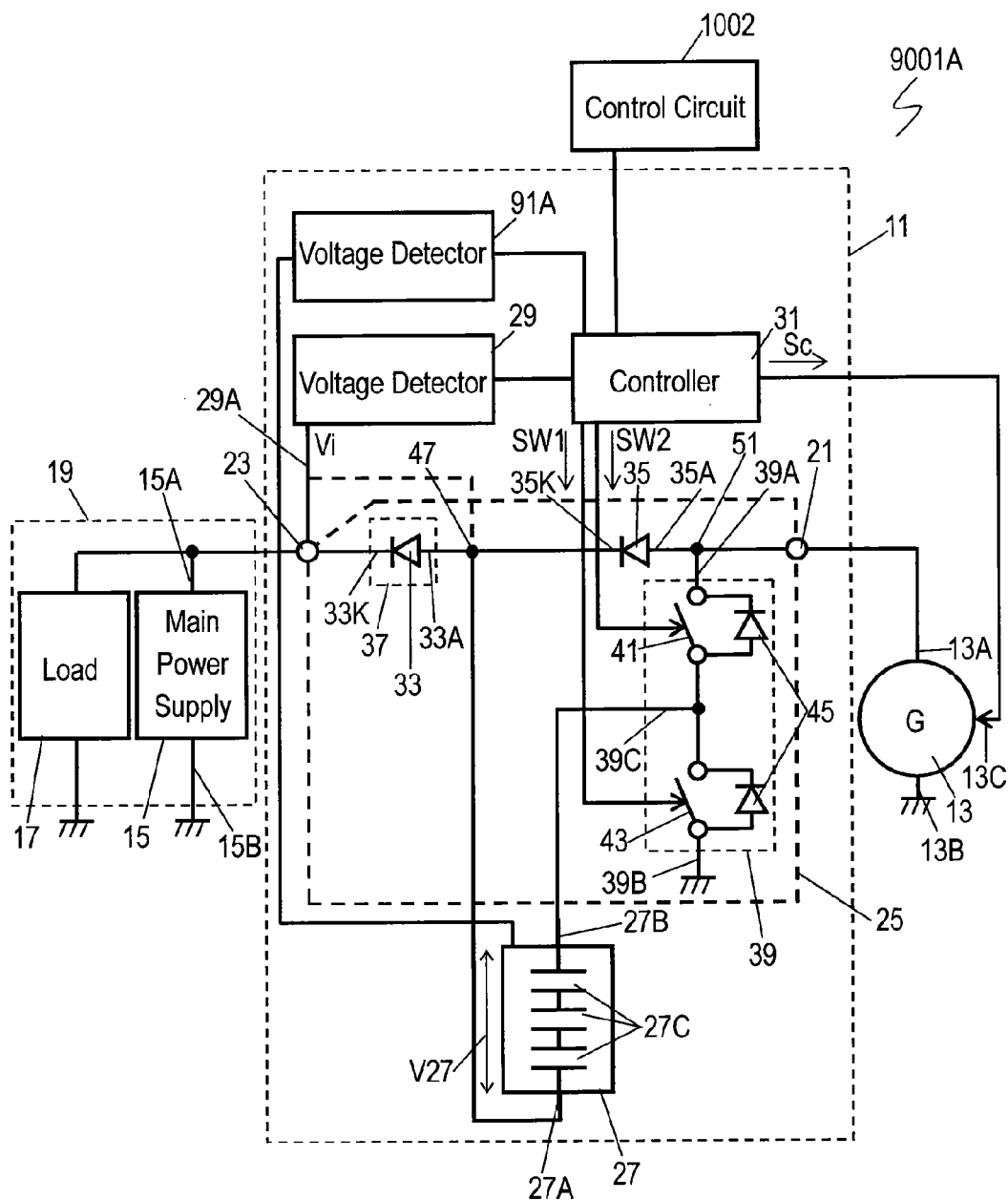
FIG. 13A is a block circuit diagram of an apparatus including still another power supply device in accordance with Embodiment 1.
Figure 13B:
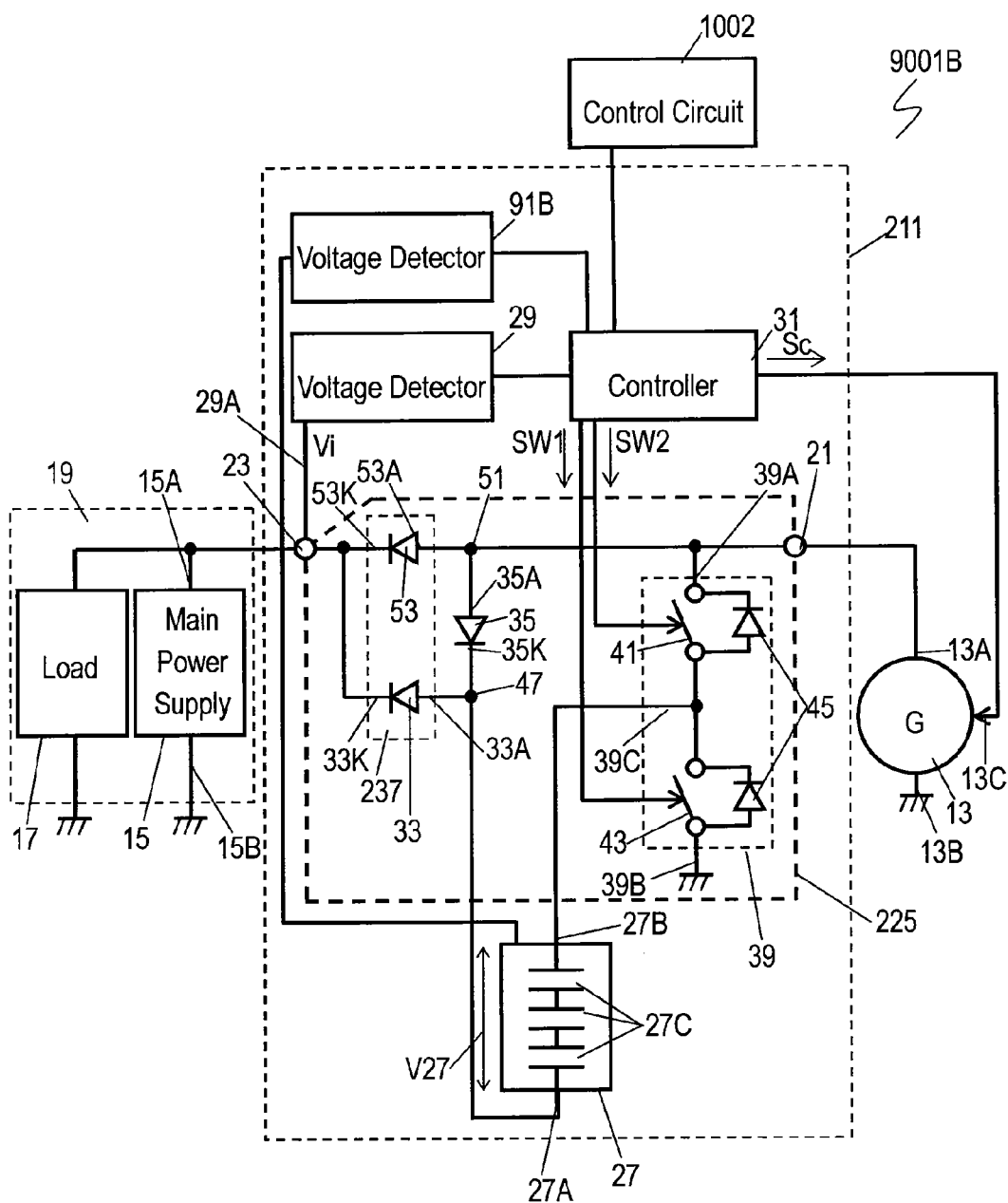
FIG. 13B is a block circuit diagram of an apparatus including still another power supply device in accordance with Embodiment 2.
Figure 13C:
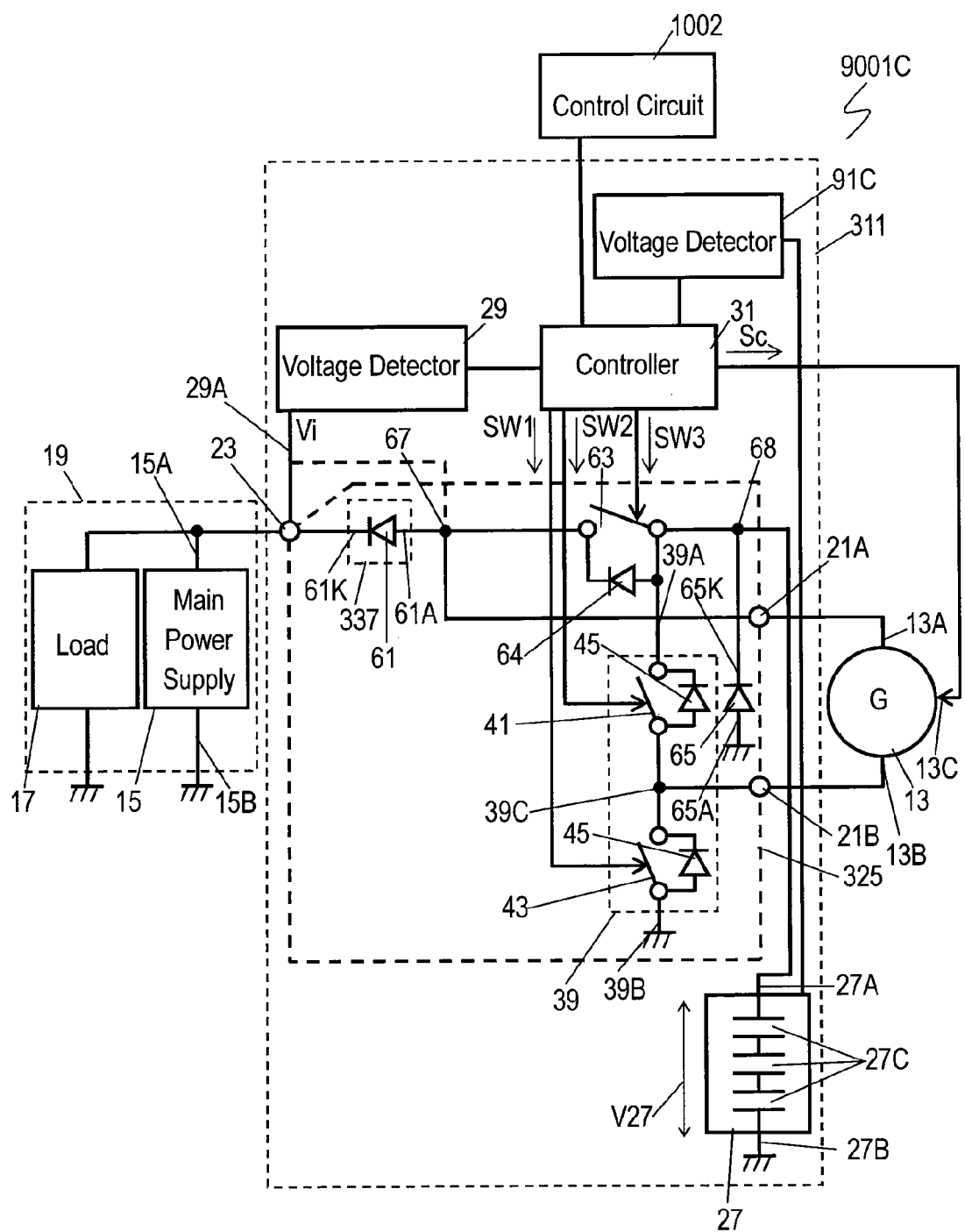
FIG. 13C is a block circuit diagram of an apparatus including still another power supply device in accordance with Embodiment 3.

FIGS. 13A to 13C are block circuit diagrams of apparatuses 9001A to 9001C including still another power supply devices 911A to 911C in accordance with Embodiments 1 to 3, respectively. In FIGS. 13A, 13B, and 13C, components identical to those of apparatuses 1001, 2001, and 3001 including power supply devices 11, 211, and 311 according to Embodiments 1 to 3 shown in FIGS. 1, 5, and 9 are denoted by the same reference numerals, and their description will be omitted. Power supply devices 911A, 911B, and 911C shown in FIGS. 13A, 13B, and 13C further includes voltage detectors 91A, 91B, and 91C for detecting voltage V27 between ends 27A and 27B of electric storage element 27 of power supply devices 11, 211, and 311 according to Embodiments 1 to 3 shown in FIGS. 1, 5, and 9, respectively. Each of voltage detectors 91A, 91B, and 91C is connected to controller 31.

In the case that controller 31 controls power generator 13 such that the voltage output from power generator 13 is a predetermined voltage (e.g. 14V or 14.5V) slightly higher than the rated voltage (e.g. 12V) of main power supply 15, immediately before the voltage output from power generator 13 exceeds the withstand voltage of electric storage element 27, switches 41 and 43 are turned off in power supply devices 11 and 211 according to Embodiments 1 and 2, and charging switch 63 is turned off in power supply device 311 according to Embodiment 3. Thus, power generator 13 stops the charging of electric storage element 27 to rapidly decrease a load on power generator 13. As a result, immediately after switches 41, 43, and 63 are turned off, the output voltage of power generator 13 overshoots, namely temporarily rises to the peak voltage, and then falls from the peak voltage to the predetermined voltage. Upon being applied to main power supply 15 and load 17, the peak voltage may cause a failure of main power supply 15 and load 17 due to an excessive voltage.

In order to avoid the above failure, power supply devices 911A to 911C shown in FIGS. 13A to 13C includes voltage detectors 91A to 91C for detecting voltage V27 between ends 27A and 27B of electric storage element 27 and transmitting them to controller 31, respectively. An operation of power supply devices 911A to 911C will be described below.

An operation of power supply devices 911A to 911C shown in FIGS. 13A to 13C to charge electric storage element 27 with a regenerative current will be described similarly to power supply devices 11, 211, and 311 to charge electric storage element 27 with regenerative current Ir1 shown in FIGS. 2, 6, and 10. Electric storage element 27 has a full charge voltage which is voltage V27 when electric storage element 27 is fully charged. Controller 31 controls power generator 13 such that the voltage output from power generator 13 becomes the full charge voltage when voltage V27 detected by voltage detectors 91A to 91C is lower than the full charge voltage. Thus, electric storage element 27 is charged at a voltage lower than the full charge voltage. Electric storage element 27 composed of four electric double layer capacitors 27C having a rated voltage of 2.5V and connected in series to each other has the full charge voltage of 10V. In this case, the voltage (10 V) output from power generator 13 is lower than the rated voltage (12 V) of main power supply 15. Therefore, regenerative current Ir from power generator 13 is blocked by diodes 33 and 61, does not flow to parallel assembly 19, and charges electric storage element 27. The electric power of main power supply 15 is supplied to load 17 while charging electric storage element 27, hence prevents load 17 from stopping.

Then, when voltage V27 of electric storage element 27 rises to the full charge voltage, in order to complete the charging, controller 31 turns off both switches 41 and 43 in power supply devices 911A and 911B shown in FIG. 13A and FIG. 13B, and the controller turns off both switches 41 and 43 or turns off charging switch 63 in power supply device 911C shown in FIG. 13C. Since the voltage output from power generator 13 is the full charge voltage (10V), switches 41, 43, and 63 are turned off and the voltage output from power generator 13 overshoots to the peak voltage. The peak voltage appearing when the voltage output from power generator 13 is fully charged is lower than the peak voltage appearing when the voltage overshoots from the predetermined voltage (14V or 14.5V). Since diodes 33 and 35 are connected between input port 21 and output port 23 of power supply device 911A shown in FIG. 13A, the peak voltage is applied to main power supply 15 and load 17 only when the peak voltage is higher than the sum (e.g. 13.4V) of the rated voltage (e.g. 12V) of main power supply 15 and the forward voltage drop (e.g. 0.7V) of each of diodes 33 and 35. Since diode 53 is connected between input port 21 and output port 23 of power supply device 911B shown in FIG. 13B, the peak voltage is applied to main power supply 15 and load 17 only when the peak voltage is higher than the sum (e.g. 12.7V) of the rated voltage (e.g. 12V) of main power supply 15 and the forward voltage drop (e.g. 0.7V) of diode 53. Since diode 61 is connected between input port 21 and output port 23 of power supply device 911C shown in FIG. 13C, the peak voltage is applied to main power supply 15 and load 17 only when the peak voltage is higher than the sum (e.g. 12.7V) of the rated voltage (e.g. 12V) of main power supply 15 and the forward voltage drop (e.g. 07V) of diode 53. Thus, apparatuses 9001A to 9001C including power supply devices 911A to 911C prevents over-voltage from being applied to main power supply 15 and load 17.

Then, controller 31 controls power generator 13 such that the output voltage of power generator 13 gradually and monotonically reaches the predetermined voltage (14V or 14.5V). Until the output voltage of power generator 13 reaches the predetermined voltage (14V or 14.5V), the voltages at nodes 47, 51, and 67 are lower than voltages to turn on diodes 33, 53, and 61. When the output voltage of power generator 13 reaches the predetermined voltage (14V or 14.5V), regenerative current Ir2 of power generator 13 is supplied to main power supply 15 and load 17, and increases efficiency of apparatuses 9001A to 9001C.

Controller 31 is operable to control power generator 13 such that the voltage output from power generator 13 reaches the full charge voltage when the detected voltage is lower than the full charge voltage during charging of electric storage element 27. Furthermore, controller 31 is operable to control power generator 13 such that the charging of electric storage element 27 is completed when the detected voltage reaches the full charge voltage, and the voltage output from power generator 13 gradually reaches the predetermined voltage.

In the case that the full charge voltage of electric storage element 27 is lower than the predetermined voltage, that is, in the case that the number of electric double layer capacitors 27C is small, attention is paid also to a negative voltage applied. In power supply devices 11 and 211 according to Embodiments 1 and 2 shown in FIGS. 4A and 8A, diode 35 is connected to electric storage element 27 in parallel. When switch 41 is turned on even after electric storage element 27 is discharged until voltage V27 of electric storage element 27 reaches about 0V, a negative voltage (e.g. −0.7V) having the absolute value of the forward voltage drop of diode 35 is applied to electric storage element 27. In the case that electric storage element 27 is composed of four electric double layer capacitors 27C connected in series, a negative voltage (e.g. about −0.18V) of ¼ the above former negative voltage is applied to each of electric double layer capacitors 27C. This negative voltage may deteriorate electric double layer capacitors 27C.

In order to prevent electric double layer capacitors 27C from deteriorating due to the negative voltage, controller 31 turns off switch 41 when voltage V27 of electric storage element 27 detected by each of voltage detectors 91A and 91B decreases to a positive voltage near 0V. This operation prevents electric storage element 27 from being connected to diode 35 in parallel, hence preventing the negative voltage from being applied to electric storage element 27.

Electric storage element 27 can be composed of a lot of electric double layer capacitors 27C connected in series to prevent voltage V27 from exceeding the full charge voltage even when electric storage element 27 is charged with regenerative current Ir1. In the case that the rated voltage as the full charge voltage of electric double layer capacitors 27C is 2.5V and that the predetermined voltage of power generator 13 is 14.5V, electric storage element 27 is composed of at least six electric double layer capacitors 27C connected in series. In consideration of the overshoot of the voltage output from power generator 13, electric storage element 27 may be composed of seven electric double layer capacitors 27C connected in series.

In this case, a negative voltage (e.g. −0.7V) having the absolute value of the forward voltage drop of diode 35 or 65 is applied to electric storage element 27. However, the number of electric double layer capacitors 27C interconnected in series is large, seven, so that a negative voltage (e.g. about −0.1V) of 1/7 the above negative voltage is applied to each of capacitors 27C. Therefore, as shown in FIGS. 4A and 8A, even when switch 41 continues to be turned on, the negative voltage does not affect capacitors 27C of electric storage element 27.

If switches 41 and 43 are simultaneously turned on when selector switch 39 of switching unit 25 is switched, namely, when switch 41 is turned off and switch 43 is turned on, or when switch 43 is turned off and switch 41 is turned on, output terminals 13A and 13B of power generator 13 are short-circuited in power supply devices 11, 211, 611, 711, 911A, and 911B according to Embodiments 1 and 2, or ends 27A and 27B of electric storage element 27 are short-circuited in power supply devices 311, 811, and 911C according to Embodiment 3. Thus, a large current can flow. In order to prevent the short circuit, controller 31 provides an deactivating period during which switching unit 25 is turned off when switching unit 25 is switched. Specifically, in the case that switch 41 is turned off and switch 43 is turned on, controller 31 turns on switch 43 after the predetermined deactivating period lapses from the time when turning off switch 41. In the case that switch 43 is turned off and switch 41 is turned on, controller 31 turns on switch 41 after the predetermined deactivating period lapses from the time when turning off switch 43. The predetermined deactivating period is obtained by adding a margin to the period from the time when controller 31 transmits control signals SW1 and SW2 to selector switch 39 so as to turn off switches 41 and 43 which are turned on to the time when switches 41 and 43 are actually turned off. The predetermined deactivating period is, for example, 0.1 seconds. The deactivating time prevents the short circuit between output terminals 13A and 13B of power generator 13 and the short circuit between ends 27A and 27B of electric storage element 27, thus providing the power supply device with high reliability.

Figure 13D:
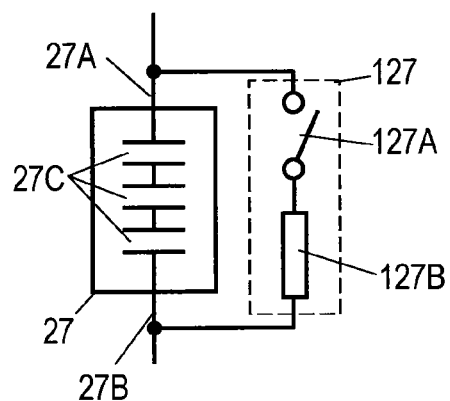
FIG. 13D is a block circuit diagram of a discharging switch of power supply devices in accordance with Embodiments 1 to 3.

When electric double layer capacitors 27C of electric storage element 27 substantially fully charged are left for a long time while apparatuses 1001, 2001, 3001, 6001, 7001, 8001, and 9001A to 9001C do not operate, the lifetime of electric double layer capacitors 27C may decrease. In power supply devices 11, 211, 311, 611, 711, 811, and 911A to 911C according to Embodiments 1 to 3, when the vehicles as apparatuses 1001, 2001, 3001, 6001, 7001, 8001, and 9001A to 9001C is ended to use, control circuit 1002 can transmit a ending signal to controller 31. In response to the ending signal, controller 31 can discharge electric storage element 27 until voltage V27 of electric storage element 27 reaches a predetermined lower limit voltage. The predetermined lower limit voltage is determined to be, for example, a half the full charge voltage of electric storage element 27. FIG. 13D is a block circuit diagram of discharging circuit 127 for discharging electric storage element 27. Discharging switch 127 includes switch 127A and discharging resistor 127B connected in series between ends 27A and 27B of electric storage element 27. While apparatuses 1001, 2001, 3001, 6001, 7001, 8001, and 9001A to 9001C shown in FIGS. 1 to 13C are used, controller 31 turns off switch 127A. Upon receiving the ending signal from control circuit 1002, controller 31 turns on switch 127A. Thus, discharging resistor 127B is connected between ends 27A and 27B of electric storage element 27 to discharge electric storage element 27.

The above circuit prevents the lifetime of electric storage element 27 from becoming short. When the automobile, the apparatus, is started to use next time, electric storage element 27 stores electric power about a half the electric power at full charge. Therefore, after starting the engine of the automobile, controller 31 can control the switching unit such that electric storage element 27 is connected to power generator 13 in series. A part of regenerative power generated by previous use can be used, and can reduce the load on power generator 13 accordingly, thus improving efficiency of the apparatus.

Diodes 33, 35, 53, and 61 have a large current flowing therein, and hence, require heat dissipation. In order to dissipate the heat, diodes 33, 35, 53, and 61 can be accommodated in power generator 13. Power generator 13 accommodating diodes 33, 35, 53, and 61 therein will be described below.

Figure 14:
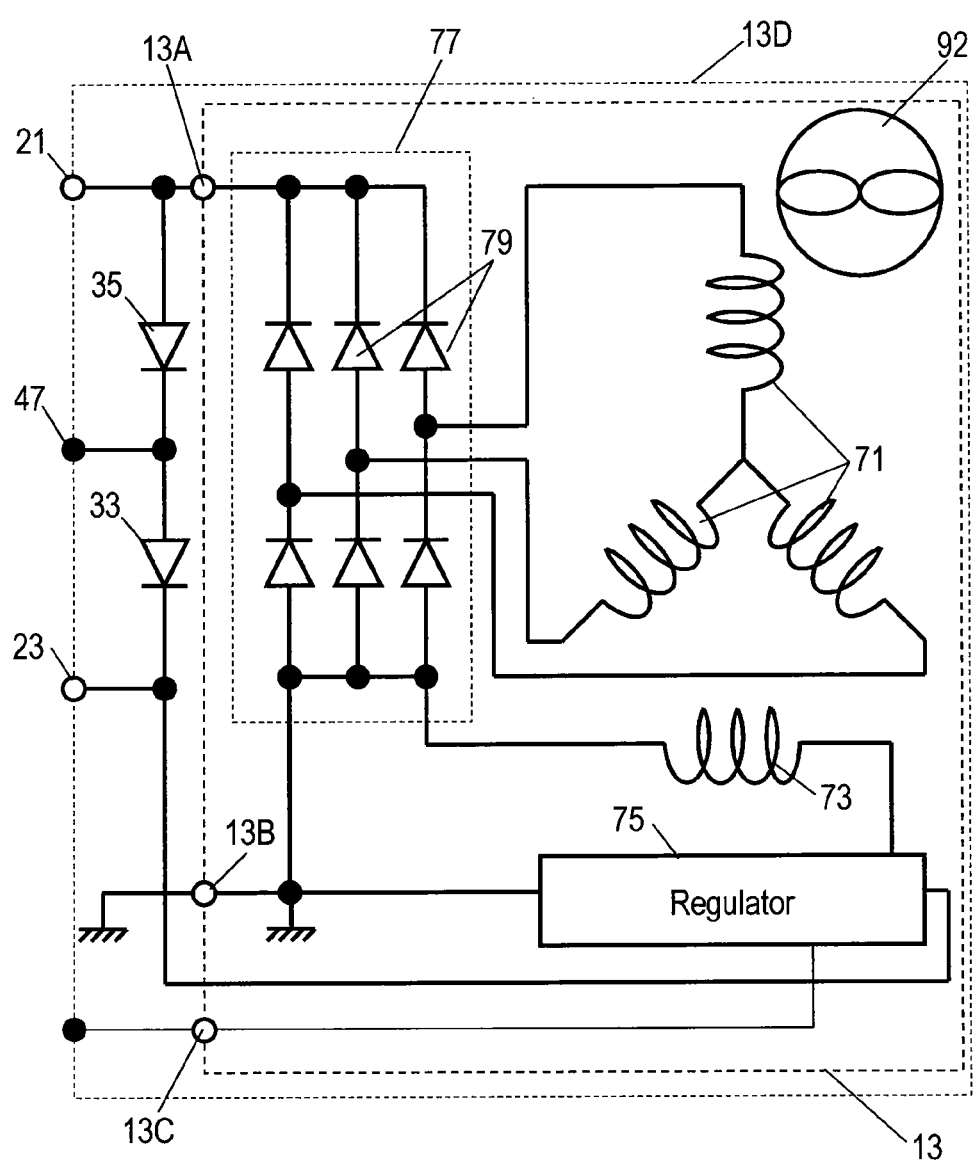
FIG. 14 is a schematic circuit diagram of a power generator of another power supply device in accordance with Embodiment 1.

FIG. 14 is a schematic circuit diagram of power generator 13 of apparatus 1001 shown in FIG. 1 in accordance with Embodiment 1. The automobile as apparatus 1001 includes an engine and fan 92 driven by the engine. Power generator 13 includes three coils 71 for generating three-phase AC power as an induced electromotive force by rotation of the engine, exciting coil 73 for controlling the induced electromotive force, regulator 75 for controlling the current flowing in exciting coil 73, rectifier 77 for converting the three-phase AC power into DC power, and case 13D accommodating coils 71, exciting coil 73, regulator 75, and rectifier 77. Case 13D further accommodates diodes 33 and 35. Regulator 75 controls the current flowing in exciting coil 73 in response to control signal Sc transmitted from controller 31. Thus, the generated power of power generator 13 can be controlled in response to control signal Sc. Rectifier 77 is formed of six rectifying diodes 79. Coils 71 function as power generating elements for generating electric power to be supplied to the power supply device.

Large currents flow in rectifying diodes 79 in order to supply the electric power to main power supply 15 and load 17, and cause rectifying diodes 79 to generate heat. Apparatus 1001 includes cooling fan 92 driven by the engine for cooling rectifying diodes 79. Diodes 33 and 35 are located near rectifying diodes 79, hence allowing cooling fan 92 to efficiently cool diodes 33 and 35 as well as rectifying diodes 79. This arrangement eliminates an additional component cooling diodes 33 and 35, thus reducing the size of apparatus 1001.

Figure 15:
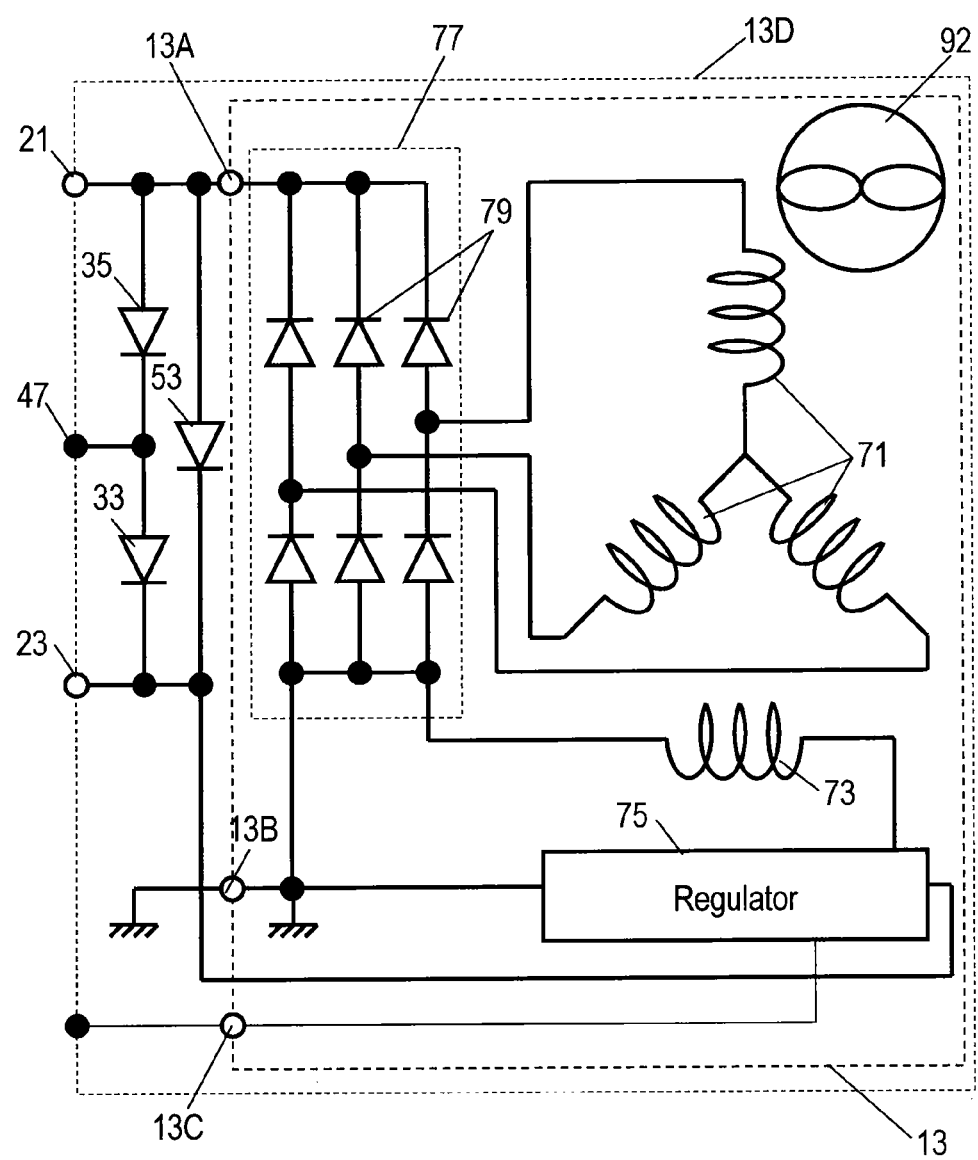
FIG. 15 is a schematic circuit diagram of a power generator of the power supply device in accordance with Embodiment 2.

FIG. 15 is a schematic circuit diagram of power generator 13 in apparatus 2001 shown in FIG. 5 in accordance with Embodiment 2. In FIG. 15, components identical to those of apparatus 1001 according to Embodiment 1 shown in FIG. 14 are denoted by the same reference numerals, and their descriptions will be omitted. Diodes 33, 35, and 53 having large currents flowing therein are accommodated in case 13D of power generator 13. Diodes 33, 35, and 53 are located near rectifying diodes 79, hence allowing cooling fan 92 to efficiently cool diodes 33, 35, and 53 as well as rectifying diodes 79.

Figure 16:
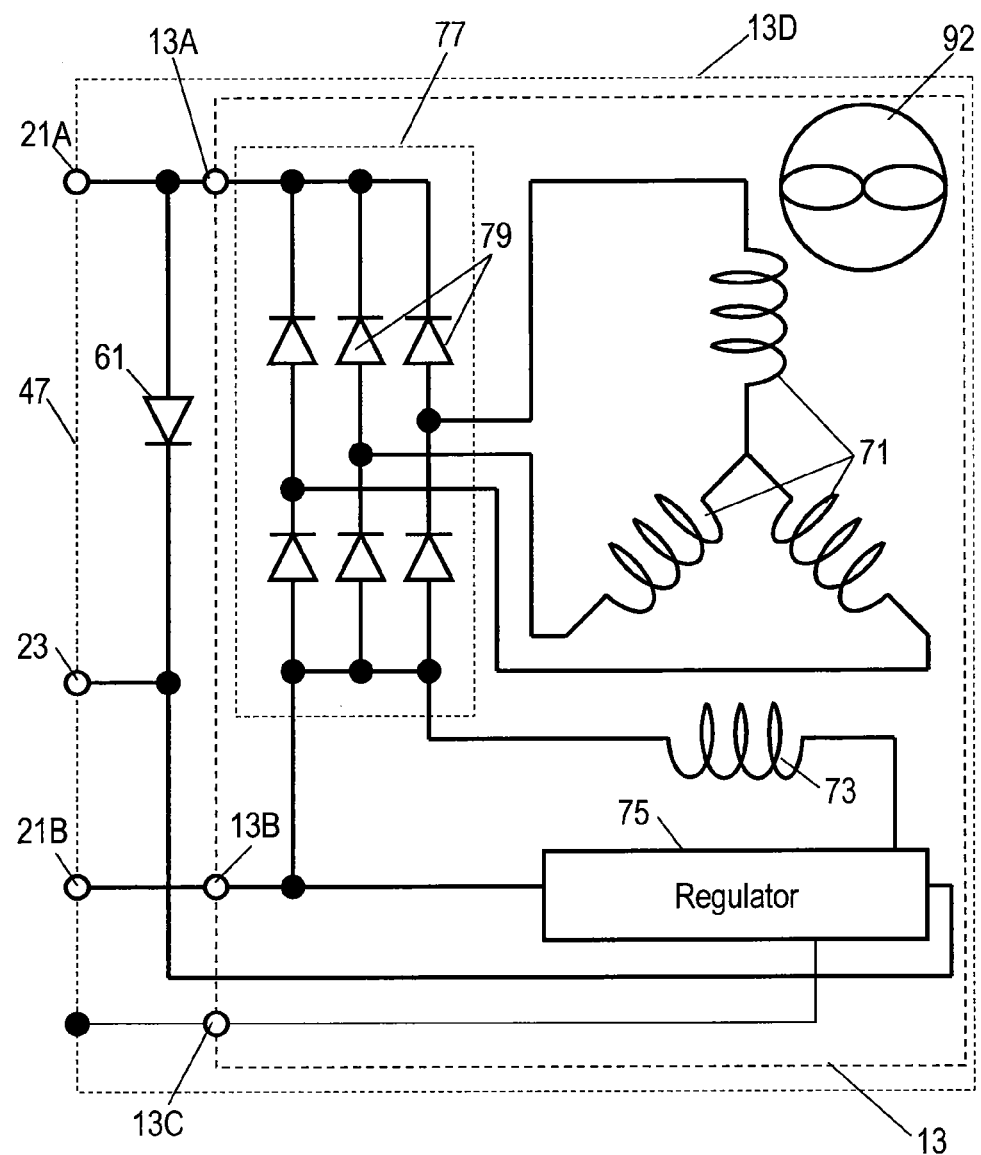
FIG. 16 is a schematic circuit diagram of a power generator of the power supply device in accordance with Embodiment 3.

FIG. 16 is a schematic circuit diagram of power generator 13 in apparatus 3001 shown in FIG. 9 in accordance with Embodiment 3. In FIG. 16, components identical to those of power generator 13 according to Embodiment 1 shown in FIG. 14 are denoted by the same reference numerals, and their description will be omitted. Diode 61 having a large current flowing therein is accommodated in case 13D of power generator 13. Diode 61 is located near rectifying diodes 79, hence allowing cooling fan 92 to efficiently cool diode 61 as well as rectifying diodes 79.

Each of apparatuses 1001 to 3001, 6001 to 8001, and 9001A to 9001C according to Embodiments 1 to 3 may include a smoothing circuit including a reactor and a capacitor connected between power generator 13 and the power supply device in order to stabilize the voltage output from power generator 13. In the apparatuses according to Embodiments 1 and 2, the reactor is connected in series between output terminal 13A of power generator 13 and input port 21 of the power supply device, and the capacitor is connected between input port 21 and the ground. In the apparatus according to Embodiment 3, the reactor is connected in series between output terminal 13A of power generator 13 and input port 21A of the power supply device, and the capacitor is connected between input ports 21A and 21B. The smoothing circuit does not necessarily include the reactor, and may include only the capacitor connected between input ports 21A and 21B.

In power supply devices 11, 211, and 311 according to Embodiments 1 to 3, electric storage element 27 is composed of electric double layer capacitors. However, electric storage element 27 can be composed of another capacitor, such as an electrochemical capacitor.

Each of apparatuses 1001 to 3001 according to Embodiments 1 to 3 is an ordinary automobile including the engine as a single power source, but may be an automobile, such as hybrid electric vehicle, driven by a motor.

INDUSTRIAL APPLICABILITY

A power supply device according to the present invention can add a regenerating function to an apparatus including a single power generator, and is useful especially as a power supply device for storing a regenerative power generated during braking of an automobile.

The invention claimed is:

1. A power supply device adapted to be used for an apparatus which includes a parallel assembly and a power generator, the parallel assembly including a main power supply and a load connected to the main power supply in parallel, the power generator having a first output terminal, said power supply device comprising:
   a first input port connected to the first output terminal of the power generator;
   an output port connected to the parallel assembly;
   an electric storage element charged with electric power generated by the power generator;
   a switching unit connected to the first input port, the output port, and the electric storage element;
   a current switcher for restricting a current flowing from the main power supply to the electric storage element; and
   a controller for controlling the power generator such that a voltage of the output port becomes a predetermined voltage, wherein
   the switching unit is operable to
      connect the electric storage element, the power generator, and the parallel assembly in parallel to each other when the electric storage element is charged with the electric power generated by the power generator, and
      connect the electric storage element, the power generator, and the parallel assembly in series to each other when the electric storage element is discharged to supply electric power stored in the electric storage element to the parallel assembly, and
   the controller is operable to control an output voltage of the power generator according to the voltage of the electric storage element so as to cause the voltage of the output port to become the predetermined voltage when the electric storage element is discharged.

2. The power supply device according to claim 1, wherein the switching unit includes
   a first diode having an anode and a cathode connected to the output port, the first diode functioning as the current switcher,
   a second diode having an anode connected to the first input port and a cathode connected to the anode of the first diode at a node, and
   a selector switch having a first branch port connected to the first input port, a second branch port connected to a ground, and a common port selectively connected to the first branch port and the second branch port,
   the electric storage element is connected between the common port of the selector switch and the node, and
   the controller is operable to
      disconnect the common port of the selector switch from the first branch port and connected the common port to the second branch port when the electric storage element is charged with the electric power generated by the power generator, and
      connect the common port of the selector switch to the first branch port and disconnect the common port from the second branch port when the electric storage element is discharged to supply electric power stored in the electric storage element to the parallel assembly.

3. The power supply device according to claim 2, wherein the first diode and the second diode are accommodated in the power generator.

4. The power supply device according to claim 2, further comprising a third diode having an anode connected to the first input port and having a cathode connected to the output port.

5. The power supply device according to claim 4, wherein the first diode, the second diode, and the third diode are accommodated in the power generator.

6. The power supply device according to claim 1, wherein the switching unit includes
   a first switch connected to the output port,
   a second switch connected to the first input port, the second switch being connected to the first switch in series at a node between the output port and the first input port, and
   a selector switch having a first branch port connected to the first input port, a second branch port connected to a ground, and a common port selectively connected to the first branch port and the second branch port,
   the electric storage element is connected between the common port of the selector switch and the node, and
   the controller is operable to
      turn on the first switch when a voltage of the node is lower than voltage of the output port,
      turn off the first switch when the voltage of the node is higher than the voltage of the output port,
      turn on the second switch when voltage of the first input port is higher than the voltage of the node,
      turn off the second switch when the voltage of the first input port is lower than the voltage of the node,
      disconnect the common port of the selector switch from the first branch port and connect the common port to the second branch port when the electric storage element is charged with the electric power generated by the power generator, and
      connect the common port of the selector switch to the first branch port and disconnected the common port from the second branch port when the electric storage element is discharged to supply electric power stored in the electric storage element to the parallel assembly.

7. The power supply device according to claim 6, further comprising
a third switch connected in series between the first input port and the output port, wherein
the controller is operable to
turn on the third switch when the electric storage element is not discharged and the voltage of the first input port is higher than the voltage of the output port, and
turn off the first switch when the voltage of the first input port is lower than the voltage of the output port.

8. The power supply device according to claim 1, further comprising
a second input port, wherein
the power generator further has a second output terminal connected to the second input port, the power generator outputting electric power between the first output terminal and the second output terminal,
the switching unit includes
a first diode having an anode connected to the first input port and having a cathode connected to the output port, the first diode functioning as the current switcher,
a selector switch having a first branch port, a second branch port connected to a ground, and a common port selectively connected to the first branch port and the second branch port,
a charging switch connected in series between the first input port and the first branch port of the selector switch, and
a second diode having a cathode connected to the first branch port of the selector switch and having a cathode connected to the ground,
the electric storage element is connected between the first branch port of the selector switch and the ground,
the second input port is connected to the common port of the selector switch, and
the controller is operable to
disconnect the common port of the selector switch from the first branch port and connect the common port to the second branch port, and turn on the charging switch when the electric storage element is charged with the electric power generated by the power generator,
connect the common port of the selector switch to the first branch port, disconnect the common port from the second branch port, and turn off the charging switch when the electric storage element is discharged to supply electric power stored in the electric storage element to the parallel assembly, and
disconnect the common port of the selector switch from the first branch port, connect the common port to the second branch port, and turn off the charging switch when the electric storage element is neither charged nor discharged.

9. The power supply device according to claim 8, wherein the first diode is accommodated in the power generator.

10. The power supply device according to claim 1, further comprising
a second input port, wherein
the power generator further has a second output terminal connected to the second input port, the power generator outputting electric power between the first output terminal and the second output terminal,
the switching unit includes
a first switch connected in series between the first input port and the output port,
a selector switch having a first branch port, a second branch port connected to a ground, and a common port selectively connected to the first branch port and the second branch port,
a charging switch connected in series between the first input port and the first branch port of the selector switch, and
a second switch connected in series between the first branch port of the selector switch and the ground,
the electric storage element is connected between the first branch port of the selector switch and the ground,
the second input port is connected to the common port of the selector switch, and
the controller is operable to
turn on the first switch when a voltage of the output port is lower than voltage of the first input port,
turn off the first switch when the voltage of the output port is higher than the voltage of the first input port,
turn on the second switch when a voltage of the ground is higher than voltage of the first branch port of the selector switch,
turn off the second switch when the voltage of the ground is lower than the voltage of the first branch port of the selector switch,
disconnect the common port of the selector switch from the first branch port, connect the common port to the second branch port, and turn on the charging switch when the electric storage element is charged with the electric power generated by the power generator,
connect the common port of the selector switch to the first branch port, disconnect the common port from the second branch port, and turn off the charging switch when the electric storage element is discharged to supply electric power stored in the electric storage element to the parallel assembly, and
disconnect the common port of the selector switch from the first branch port, connect the common port to the second branch port, and turn off the charging switch when the electric storage element is neither being charged nor discharged.

11. The power supply device according to claim 1, wherein the electric storage element comprises a capacitor.

12. The power supply device according to claim 1, wherein the apparatus is an automobile, and
the controller is operable to store electric power output from the power generator in the electric storage element when the automobile decelerates.

13. The power supply device according to claim 1, wherein the apparatus is an automobile, and
the controller is operable to supply electric power stored in the electric storage element to the parallel assembly when the automobile accelerates.

14. The power supply device according to claim 1, wherein the controller is operable to control the switching unit such that the switching unit has a deactivating period while the switching unit is switched.

15. The power supply device according to claim 1, further comprising
a voltage detector for detecting a voltage of the electric storage element, wherein
the voltage of the electric storage element is fully charged is a full charge voltage, and the controller is operable to
- control the power generator such that a voltage output from the power generator becomes the full charge voltage when the detected voltage is lower than the full charge voltage while the electric storage element is discharged, and
- control the power generator such that charging of the electric storage element is completed and that the voltage output from the power generator gradually reaches the predetermined voltage when the detected voltage reaches the full charge voltage.

16. The power supply device according to claim 1, further comprising:
- a voltage detector for detecting a voltage of the electric storage element; and
- a discharging circuit for discharging the electric storage element when the apparatus is ended to use until the detected voltage reaches a predetermined lower-limit voltage.

* * * * *